United States Patent
Sunaga (12)

(10) Patent No.: US 6,626,541 B2
(45) Date of Patent: Sep. 30, 2003

(54) PROJECTION OPTICAL SYSTEM AND PROJECTION TYPE DISPLAYING APPARATUS USING THE SAME

(75) Inventor: Toshihiro Sunaga, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,517

(22) Filed: Mar. 8, 2001

(65) Prior Publication Data

US 2002/0008853 A1 Jan. 24, 2002

(30) Foreign Application Priority Data

Mar. 9, 2000 (JP) .................................. 2000-065404

(51) Int. Cl.⁷ .................. G03B 21/14; G03B 21/28; G02B 23/00; G02B 5/10
(52) U.S. Cl. ................... 353/69; 353/70; 353/98; 353/99; 359/364; 359/858; 359/859
(58) Field of Search ................. 353/69, 70, 98, 353/99, 100, 101, 102; 359/858, 859, 364

(56) References Cited

U.S. PATENT DOCUMENTS

| | | | |
|---|---|---|---|
| 5,687,025 A | * | 11/1997 | Nanba ........................ 359/633 |
| 5,871,266 A | * | 2/1999 | Negishi et al. ............... 353/98 |
| 5,947,576 A | * | 9/1999 | Sato et al. ..................... 353/70 |
| 6,204,978 B1 | * | 3/2001 | Akiyama et al. ............ 359/729 |
| 6,318,869 B1 | * | 11/2001 | Hudyma ...................... 359/857 |

FOREIGN PATENT DOCUMENTS

| | | | |
|---|---|---|---|
| JP | 5-080418 | 4/1993 | ........... G03B/21/00 |
| JP | 5-100312 | 4/1993 | ........... G03B/21/00 |
| JP | 8-292371 | 11/1996 | ........... G02B/17/00 |
| JP | 8-292372 | 11/1996 | ........... G02B/17/08 |
| JP | 9-5650 | 1/1997 | ........... G02B/25/00 |
| WO | 97/01787 | 1/1997 | ........... G02B/27/18 |

* cited by examiner

*Primary Examiner*—Russell Adams
*Assistant Examiner*—Melissa J Koval
(74) *Attorney, Agent, or Firm*—Morgan & Finnegan, LLP

(57) ABSTRACT

A projection optical system is provided to guide a beam from an image display panel onto a screen surface inclined relative to a reference axis, and to form image information on the screen surface. The projection optical system has a reflecting optical system which has a plurality of rotation-asymmetrical reflecting surfaces having curvatures, and in which the beam from the image display panel is reflected by the plurality of rotation-asymmetrical reflecting surfaces and is guided onto the screen surfaces of the reflecting optical system or between the reflecting optical system and the image display panel. The stop is set so as to be imaged at a negative magnification by an optical member disposed more adjacent to the screen than the stop position.

45 Claims, 13 Drawing Sheets

PROJECTION OPTICAL SYSTEM AND PROJECTION TYPE DISPLAYING APPARATUS USING THE SAME

BACKGROUND OF THE INVENTION

1. Field of the Invention

This invention relates to a projection optical system and a projection type displaying apparatus using the same, and in suitable for an optical apparatus such as a liquid crystal projector (projection) for directing a beam light-modulated by an image displaying panel such as a liquid crystal display element (liquid crystal panel) or a digital micromirror device to a screen or a wall, and forming image information.

2. Related Background Art

There have heretofore been proposed various passive type projectors for illuminating an image displaying panel such as a liquid crystal panel by a beam from a light source, enlarging and projecting it onto a screen or a wall by a projection lens by the use of transmitted light or reflected light light-modulated by the image displaying panel and forming an image.

There have been proposed various projection optical systems for use for projection capable of effecting oblique projection onto a screen to shorten the distance between the screen and the apparatus. FIG. 15 of the accompanying drawings is a schematic view of an embodiment of a projection optical system disclosed in Japanese Patent Application Laid-Open No. 05-100312. In FIG. 15, L designates an illumination system, and LV denotes a light valve using transmission or reflection type dot matrix liquid crystal or the like. An image based on the light valve LV is enlarged and projected onto a screen S by a projection optical system PL, and is displayed on the screen S. In the invention of this publication, a wide angle lens having a great angle of field is used as the projection optical system PL, and the light valve LV and the screen S are shifted and disposed relative to the optical axis La of the projection optical system PL, and projection is effected by the use of the end portion of the angle of field to thereby constitute an oblique projection optical system.

FIG. 16 of the accompanying drawings is a schematic view of an embodiment of a projection optical system disclosed in Japanese Patent Application Laid-Open No. 05-080418. In FIG. 16, L designates an illumination system, and LV denotes a light valve using transmission or reflection type dot matrix liquid crystal or the like. An image based on the light valve LV is projected by a first projection optical system PL1 to thereby form an intermediate image, which in turn is enlarged and projected onto a screen S by a second projection optical system PL2. In the invention of this publication, the optical axes of the first and second projection optical systems are appropriately inclined to thereby project the image obliquely onto the screen.

Also, in republished Patent No. WO 97/01787, there is disclosed a projection optical system for projecting an image from an oblique direction by the use of a plurality of reflecting surfaces.

On the other hand, recently, there have been proposed various imaging systems utilizing a non-coaxial optical system to achieve the downsizing of the entire optical system. In the non-coaxial optical system, the concept of the reference axis is introduced and a constituent surface is made into an asymmetrical aspherical surface, whereby it is possible to construct an optical system in which aberrations are sufficiently corrected, and a designing method therefor is shown, for example, in Japanese Patent Application Laid-Open No. 9-5650, and examples of the design thereof are shown in Japanese Patent Application Laid-Open No. 8-292371 and Japanese Patent Application Laid-Open No. 8-292372.

Such a non-coaxial optical system is called an off-axial optical system (when supposing a reference axis along a ray passing through the center of an image and the center of a pupil, an optical system defined as an optical system including a curved surface (off-axial curved surface) in which a plane normal at the point of intersection between the constituent surface and the reference axis is not on the reference axis, and at this time, the reference axis is of a bent shape). In this off-axial optical system, the constituent surface is generally non-coaxial and eclipse does not occur even in a reflecting surface and therefore, it is easy to construct an optical system using a reflecting surface. The off-axial optical system also has the feature that it is easy to make an integral type optical system by a technique of integrally molding the constituent surface whereby an optical path can be relatively freely designed.

In Japanese Patent Application Laid-Open No. 05-100312, use is made of a projection optical system in which a light valve and a screen are shifted relative to an optical axis, and in this case, as shown in FIG. 11 of the accompanying drawings, the magnitude of the angle of field of the projection optical system used is θ2. However, a lens system of a high angle of field having a considerably great angle of field (θ1) is required as the projection optical system used. Also, in an ordinary lens system, the quantity of light decreases as the angle of field becomes greater from the optical axis La. Therefore, if a lens system of a higher angle of field is used, a difference will come out in brightness particularly in the vertical direction of a screen S. Also, when design is made such that the optical axis La goes toward the center of the screen S (FIG. 12 of the accompanying drawings), an image is not formed on the screen S but is formed on a plane S' perpendicular to the optical axis La in the ordinary lens system. When such design is made, as is well known, the projected image is distorted into a trapezoid and the focus deviates in the vertical direction of the screen S. When the inclination of this image plane is to be corrected, the difference between the optical path L1 of a ray passing through the upper portion of the screen S and the optical path L2 of a ray passing through the lower portion of the screen S must be negated. When this difference is to be corrected, if it can be corrected near the imaging plane, the difference between the optical path L1 and the optical path L2 will be reduced and therefore the amount of correction may be small. On the other hand, when the difference is to be corrected on the optical surface of the screen side on which the projected image is enlarged, the difference between the optical path L1 and the optical path L2 directly affects.

Also, in an apparatus disclosed in Japanese Patent Application Laid-Open No. 05-080418, a lens system is only tilted and therefore it is difficult to incline the image plane sufficiently.

Also, if the amount of tilt is too great, it will become difficult to secure optical performance.

In a projection optical system in a reflection type displaying apparatus disclosed in republished Patent No. WO 97/01787, a coaxial system is comprised of a concave mirror and one or two convex mirrors, and an image is projected from an oblique direction by the use of some of the reflecting surfaces of the concave mirror and the convex mirrors. Because of the coaxial system, aberration correction is difficult and it is difficult to make the reflecting optical system bright (to make F number small).

Also, the projection optical system uses a construction in which a stop is disposed between the reflecting members. A beam passed through the stop is incident on the convex mirror, and a divergent beam from this convex mirror is incident on the next convex mirror. Therefore, the effective diameter of the second convex mirror has tended to increase. Also, at this time, the two convex mirrors form the virtual image of the stop.

SUMMARY OF THE INVENTION

It is an object of the present invention to provide a projection optical system and a projection type displaying apparatus using the same.

It is also an object of the present invention to provide a bright projection optical system and a projection type displaying apparatus using the same.

To achieve the above object, the projection optical system of the present invention is a projection optical system for guiding a beam from an image display panel onto a screen surface inclined relative to a reference axis (an optical path linking the center of the image display panel and the center of the range of projection on the screen together), and forming image information on the screen surface, comprising:

a reflecting optical system having a plurality of rotation-asymmetrical reflecting surfaces having curvatures; and a stop between the plurality of rotation-asymmetrical reflecting surfaces of the reflecting optical system or between the reflecting optical system and the image display panel;

the stop being imaged at a negative magnification by an optical member disposed more adjacent to the screen than the position of the stop.

In the above-described projection optical system, the refractive power of the reflecting surface having a curvature on which the light passed through the stop is incident at first is positive.

The above-described projection optical system is used when the image display panel and the screen are disposed in a non-parallel state.

In the above-described projection optical system, the reflecting optical system condenses the beam from the image display panel and forms an intermediate image.

In the above-described projection optical system, at least one of the plurality of rotation-asymmetrical reflecting surfaces comprises a surface reflecting mirror.

In the above-described projection optical system, at least one of the plurality of rotation-asymmetrical reflecting surfaces comprises a back reflecting mirror.

In the above-described projection optical system, the reflecting optical system includes at least one optical block designed such that two refracting surfaces and the plurality of rotation-asymmetrical reflecting surfaces having curvatures are formed on the surface of a transparent member, and the beam from the image display panel enters the interior of the transparent member from one of the refracting surfaces, is reflected by the plurality of rotation-asymmetrical reflecting surfaces and emerges from the other refracting surface.

In the above-described projection optical system, at least two of the plurality of rotation-asymmetrical reflecting surfaces are integrally made by molding.

In the above-described projection optical system, when the principal point position at an azimuth $\xi$ degrees on the image display panel side when the refracting optical system is evolved about the center line linking the center of the image display panel and the center of the image information on the screen surface together is defined as $H(\xi)$, and an azimuth representing a plane containing the center line and a normal to the screen surface is defined as $\alpha$, the condition that $$|(H(\alpha+90°)-H(\alpha))/H(\alpha)|<0.2$$

is satisfied.

In the above-described projection optical system, when the angle formed by the center line linking the center of the image display panel and the center of the image formation on the screen surface together and a normal to the screen is defined as $\theta$, and the focal length at an azimuth $\xi$ degrees when the reflecting optical system is evolved about the center line is defined as $f(\xi)$, and the azimuth representing a plane containing the center line and the normal to the screen is defined as $\alpha$, the condition that $$|1-\cos\theta \cdot f(\alpha)/f(\alpha+90°)|<0.2$$

is satisfied.

In the above-described projection optical system, the reflecting optical system has three or more rotation-asymmetrical aspherical reflecting surfaces.

In the above-described projection optical system, the reflecting optical system has six rotation-asymmetrical aspherical reflecting surfaces, and the six reflecting surfaces have positive, negative, negative, positive, negative and positive refractive power in succession from the screen side or positive, negative, positive, negative, positive and positive refractive power in succession from the screen side.

The projection type displaying apparatus of the present invention is provided with the above-described projection optical system, and guides a beam based on the image display panel onto a screen surface, and forms image information on the screen surface.

The projection type displaying apparatus of the present invention is provided with the above-described projection optical system, and guides a beam based on the image display panel to a transmission type screen through the intermediary of one or more plane mirrors, and forms image information on the screen surface.

Also, the projection optical system of the present invention is a projection optical system for projecting light from a display panel, comprising:

a stop; and a plurality of reflecting surfaces;

the refractive power of one of the plurality of reflecting surfaces on which the light passed through the stop is incident at first and which has refractive power being positive.

In the above-described projection optical system, the reflecting surface on thick the light passed through the stop is incident at first and which has a curvature is a concave reflecting surface or a refracting surface.

In the above-described projection optical system, the reflecting surface on which the light passed through the stop is incident at first and which has a curvature is an aspherical surface having refractive power.

The above-described projection optical system further includes a plurality of aspherical reflecting surfaces having refractive power.

In the above-described projection optical system, the reflecting surface on which the light passed through the stop is incident at first and which has a curvature is a rotation-asymmetrical aspherical surface.

In the above-described projection optical system, the plurality of reflecting surfaces include a plurality of reflecting surfaces having a plurality of rotation-asymmetrical aspherical surfaces and having refractive power.

The above-described projection optical system is used when the image display panel and the screen are disposed in a non-parallel state.

In the above-described projection optical system, the reflecting optical system condenses the beam from the image display panel and forms an intermediate image.

In the above-described projection optical system, at least one of the plurality of rotation-asymmetrical reflecting surfaces comprises a surface reflecting mirror.

In the above-described projection optical system, at least one of the plurality of rotation-asymmetrical reflecting surfaces comprises a back reflecting surface.

In the above-described projection optical system, the reflecting optical system includes at least one optical block designed such that two refracting surfaces and the plurality of rotation-asymmetrical reflecting surfaces having curvatures are formed on the surface of a transparent member, and the beam from the image display panel enters the interior of the transparent member from one of the refracting surfaces, is reflected by the plurality of rotation-asymmetrical reflecting surfaces and emerges from the other refracting surface.

In the above-described projection optical system, at least two of the plurality of rotation-asymmetrical reflecting surfaces are integrally made by molding.

In the above-described projection optical system, when the principal point position at an azimuth ξ degrees on the image display panel side when the reflecting optical system is evolved about the center line linking the center of the image display panel and the center of the image information on the screen surface together is defined as H(ξ), and an azimuth representing a plane containing the center line and a normal to the screen surface is defined as α, the condition that $$|(H(\alpha+90°)-H(\alpha))/H(\alpha)|<0.2$$

is satisfied.

In the above-described projection optical system, when the angle formed by the center line linking the center of the image display panel and the center of the image information on the screen surface together and a normal to the screen is defined as θ, and the focal length at an azimuth ξ degrees when the reflecting optical system is evolved about the center line is defined at f(ξ), and an azimuth representing a plane containing the center line and the normal to the screen is defined as α, the condition that $$|1-\cos\theta \cdot f(\alpha)/f(\alpha+90°)|<0.2$$

is satisfied.

In the above-described projection optical system, the reflecting optical system has three or more rotation-asymmetrical aspherical reflecting surfaces.

In the above-described projection optical system, the reflecting optical system has six rotation-asymmetrical aspherical reflecting surfaces, and the six reflecting surfaces have positive, negative, negative, positive, negative and positive refractive power in succession from the screen side or positive, negative, positive, negative, positive and positive refractive power in succession from the screen side.

The projection type displaying apparatus of the present invention is provided with the above-described projection optical system, and guides a beam based on the image display panel onto a screen surface, and forms image information on the screen surface.

Also, the projection type displaying apparatus of the present invention is provided with the above-described projection optical system, and guides a beam based on the image display panel to a transmission type screen through the intermediary of one or more plane mirrors, and forms image information on the screen surface.

Also, the projection optical system of the present invention is a projection optical system for guiding a beam from an image display panel onto a screen surface inclined relative to a reference axis, and forming image information on the screen surface, comprising:

a reflecting optical system having a plurality of rotation-asymmetrical reflecting surfaces having curvatures;

wherein the beam from the image display panel is condensed by an optical element including the reflecting optical system to thereby form an intermediate image.

The above-described projection optical system is used when the image display panel and the screen are disposed in a non-parallel state.

In the above-described projection optical system, at least one of the plurality of rotation-asymmetrical reflecting surfaces comprises a surface reflecting mirror.

In the above-described projection optical system, at least one of the plurality of rotation-asymmetrical reflecting surfaces comprises a back reflecting mirror.

In the above-described projection optical system, the reflecting optical system includes at least one optical block designed such that two refracting surfaces and the plurality of rotation-asymmetrical reflecting surfaces having curvatures are formed on the surface of a transparent member, and the beam from the image display panel enters the interior of the transparent member from one of the refracting surfaces, is reflected by the plurality of rotation-asymmetrical reflecting surfaces and emerges from the other refracting surface.

In the above-described projection optical system, at least two of the plurality of rotation-asymmetrical reflecting surfaces are integrally made by molding.

In the above-described projection optical system, when the principal point position at an azimuth ξ degrees on the image display panel side when the reflecting optical system is evolved about the center line linking the center of the image display panel and the center of the image information on the screen surface together is defined as H(ξ), and an azimuth representing a plane containing the center line and a normal to the screen surface is defined as α, the condition that $$|(H(\alpha+90°)-H(\alpha))/H(\alpha)|<0.2$$

is satisfied.

In the above-described projection optical system, when the angle formed by the center line linking the center of the image display panel and the center of the image information on the screen surface together and a normal to the screen is defined as θ, and the focal length at an azimuth ξ degrees when the reflecting optical system is evolved about the center line is defined as f(ξ), and an azimuth representing a plane containing the center line and the normal to the screen is defined as α, the condition that $$|1-\cos\theta \cdot f(\alpha)/f(\alpha+90°)|<0.2$$

is satisfied.

In the above-described projection optical system, the reflecting optical system has three or more rotation-asymmetrical aspherical reflecting surfaces.

In the above-described projection optical system, the reflecting optical system has six rotation-asymmetrical aspherical reflecting surfaces, and the six reflecting surfaces have positive, negative, negative, positive, negative and positive refractive power in succession from the screen side or positive, negative, positive, negative, positive and positive refractive power in succession from the screen side.

Also, the projection type displaying apparatus of the present invention is provided with the above-described projection optical system, and guides a beam based on the image display panel onto a screen surface and forms image information on the screen surface.

Also, the projection type displaying apparatus of the present invention is provided with the above-described projection optical system, and guides a beam based on the image display panel to a transmission type screen through the intermediary of one or more plane mirrors, and forms image information on the screen surface.

Also, the projection optical system of the present invention is a projection optical system for guiding a beam from an image display panel onto a screen surface inclined relative to a reference axis (an optical path linking the center of the image display panel and the center of the range of projection on the screen together), and forming image information on the screen surface, provided with:

a reflecting optical system having a plurality of rotation-asymmetrical reflecting surfaces having curvatures;

the number of the rotation-asymmetrical reflecting surfaces being three or more.

The above-described projection optical system is used when the image display panel and the screen are disposed in a non-parallel state.

In the above-described projection optical system, the reflecting optical system condenses the beam from the image display panel and forms an intermediate image.

In the above-described projection optical system, at least one of the plurality of rotation-asymmetrical reflecting surfaces comprises a surface reflecting mirror.

In the above-described projection optical system, at least one of the plurality of rotation-asymmetrical reflecting surfaces comprises a back reflecting mirror.

In the above-described projection optical system, the reflecting optical system includes at least one optical block designed such that two refracting surfaces and the plurality of rotation-asymmetrical reflecting surfaces having curvatures are formed on the surface of a transparent member, and the beam from the image display panel enters the interior of the transparent member from one of the refracting surfaces, is reflected by the plurality of rotation-asymmetrical reflecting surfaces and emerges from the other refracting surface.

In the above-described projection optical system, at least two of the plurality of rotation-asymmetrical reflecting surfaces are integrally made by molding.

In the above-described projection optical system, when the principal point position at an azimuth $\xi$ degrees on the image display panel side when the reflecting optical system is evolved about the center line linking the center of the image display panel and the center of the image information on the screen surface together is defined as $H(\xi)$, and an azimuth representing a plane containing the center line and a normal to the screen surface is defined as $\alpha$, the condition that $$|(H(\alpha+90°)-H(\alpha))/H(\alpha)|<0.2$$

is satisfied.

In the above-described projection optical system, when the angle formed by the center line linking the center of the image display panel and the center of the image information on the screen surface together and a normal to the screen is defined as $\theta$, and the focal length at an azimuth $\xi$ degrees when the reflecting optical system is evolved about the center line is defined as $f(\xi)$, and an azimuth representing a plane containing the center line and the normal to the screen is defined as $\alpha$, the condition that $$|1-\cos\theta\cdot f(\alpha)/f(\alpha+90°)|0.2$$

is satisfied.

In the above-described projection optical system, the reflecting optical system has three or more rotation-asymmetrical aspherical reflecting surfaces.

In the above-described projection optical system, the reflecting optical system has six rotation-asymmetrical aspherical reflecting surfaces, and the six reflecting surfaces have positive, negative, negative, positive, negative and positive refractive power in succession from the screen side or positive, negative, positive, negative, positive and positive refractive power in succession from the screen side.

Also, the projection type displaying apparatus of the present invention is provided with the above-described projection optical system, and guides a beam based on the image display panel onto a screen surface, and forms image information on the screen surface.

Also, the projection type displaying apparatus of the present invention is provided with the above-described projection optical system, and guides a beam based on the image display panel to a transmission type screen through the intermediary of one or more plane mirrors, and forms image information on the screen surface.

DETAILED DESCRIPTION OF THE PREFERRED EMBODIMENTS

Before starting the description of embodiments, description will be made of the manner of representing the constituent numerical data of the embodiments and items common to all embodiments.

Figure 17:
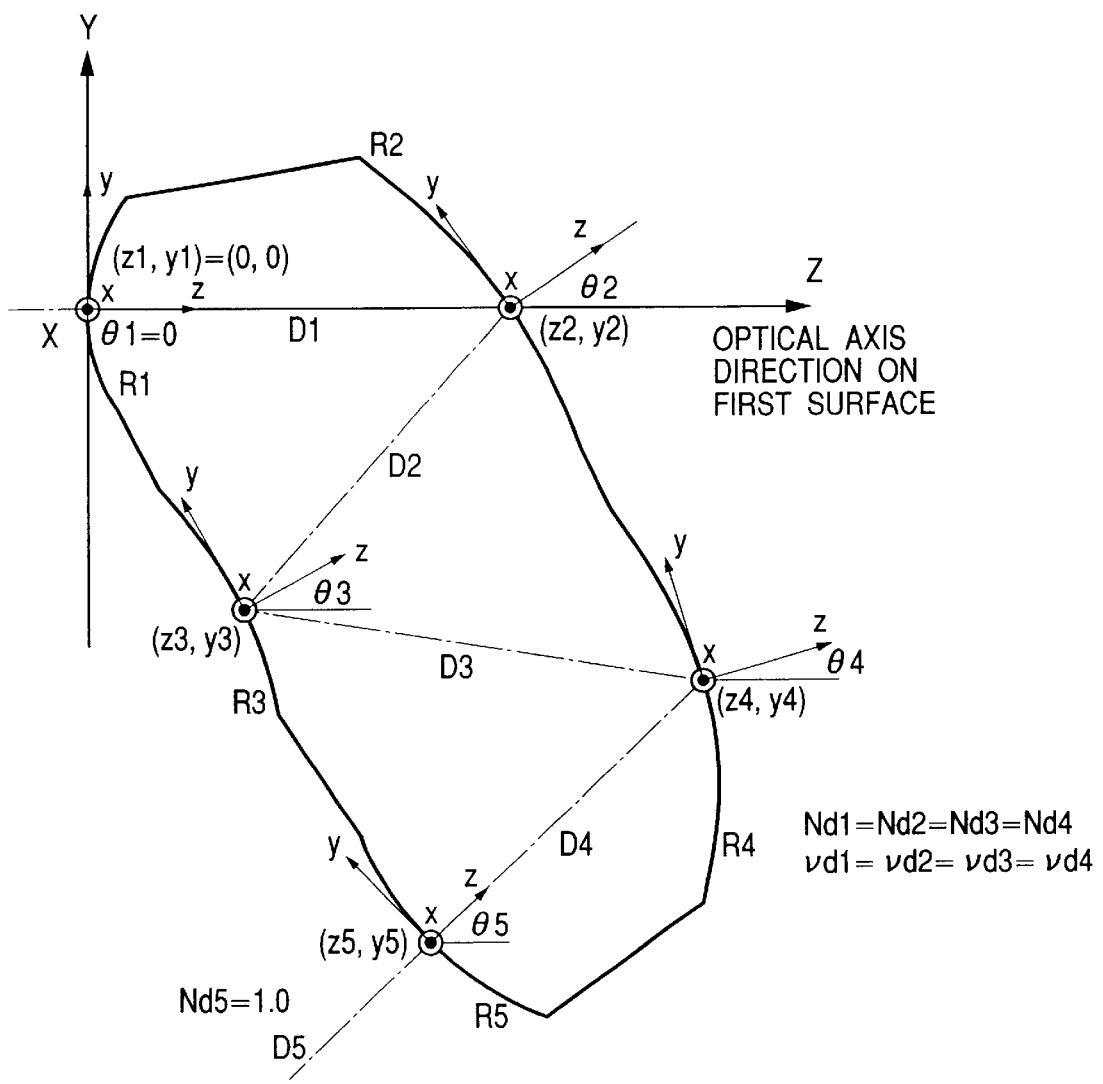
FIG. 17 is an illustration of the coordinate system of a reflecting optical system in the present invention.

FIG. 17 is an illustration of a coordinate system defining the construction data of the optical system of the present invention. In the embodiments of the present invention, the i-th surface along a ray travelling from the object side to the image plane (indicated by dot-and-dash line in FIG. 17 and called the reference axis ray) is defined as the i-th surface.

In FIG. 17, the first surface R1 is a refracting surface, the second surface R2 is a reflecting surface tilted relative to the first surface R1, the third surface R3 and the fourth surface R4 are reflecting surfaces shifted and tilted relative to their respective preceding surfaces, and the fifth surface R5 is a refracting surface shifted and tilted relative to the fourth surface R4. The first surface R1 to the fifth surface R5 are constructed on an optical element formed of a medium such as glass or plastic, and in FIG. 17, the optical element is shown as a first optical element B1.

Accordingly, in the construction of FIG. 17, the medium from the object surface, not shown, to the first surface R1 is air, the medium from the first surface R1 to the fifth surface R5 is a certain common medium, and the medium from the fifth surface R5 to the sixth surface R6, not shown, is air.

The optical system of the present invention is an off-axial optical system and therefore, the surfaces constituting the optical system do not have a common optical axis. So, in the embodiments of the present invention, an absolute coordinate system having the center of the first surface as the origin is first set.

In the embodiments of the present invention, the central point of the first surface is defined as the origin and also, the route of a ray passing through the origin and the center of the final imaging plane (reference axis ray) is defined as the reference axis of the optical system. Further, the reference axis in the present embodiment has a direction. The direction is a direction in which the reference axis ray travels when it is imaged.

While in the embodiments of the present invention, the reference axis which is the reference of the optical system is set as described above, an axis convenient in optical design, in settling aberrations or in expressing the shapes of the surfaces constituting the optical system can be adopted as the axis which is the reference of the optical system. Generally, however, the route of a ray passing through the center of the image plane and a stop, an entrance pupil, an exit pupil, the center of the first surface of the optical system or the center of the last surface of the optical system is set as the reference axis which is the reference of the optical system.

That is, in the embodiments of the present invention, the route along which the ray passing through the central point of the first surface to the center of the final imaging plane (the reference axis ray) is refracted and reflected by the refracting surfaces and the reflecting surfaces is set as the reference axis. The order of the surfaces is set to the order in which the reference axis ray is subjected to refraction and reflection.

Accordingly, the reference axis finally arrives at the center of the image plane while changing its direction in accordance with the law of refraction or reflection along the set order of the surfaces.

The tilted surface constituting the optical system according to each embodiment of the present invention are basically all tilted in the same plane. So, the axes of the absolute coordinate system are defined as follows:

Z-axis: a straight line passing through the origin and the center of the object surface, and the direction from the object surface toward the first surface R1 is defined as positive.

Y-axis: a straight line passing through the origin and forming counter-clockwisely 90° relative to the Z-axis in the tilted surface (the plane of the drawing sheet of FIG. 17).

X-axis: a straight line passing through the origin and perpendicular to the Z-axis and the Y-axis (straight line perpendicular to the plane of the drawing sheet of FIG. 17).

Also, to represent the surface shape of the i-th surface constituting the optical system, it is easier to understand in recognizing the shape to set a local coordinate system having as the origin a point at which the reference axis and the i-th surface intersect with each other, and represent the surface shape of that surface by the local coordinate system than to represent the shape of that surface by the absolute coordinate system and therefore, the surface shape of the i-th surface is represented by the local coordinate system.

Also, the tilt angle of the i-th surface in YZ plane is represented by an angle $\theta i$ (unit: °) in which the counter-clockwise direction relative to the Z-axis of the absolute coordinate system is positive. Consequently, in the embodiments of the present invention, the origin of the local coordinates of each surface is on YZ plane in FIG. 17. Also, the eccentricity of the surfaces in XZ and XY planes is null. Further, the y-axis and the z-axis of the local coordinates (x, y, z) of the i-th surface are inclined by an angle $\theta i$ in YZ plane relative to the absolute coordinate system (X, Y, Z), and specifically are set as follows:

z-axis: a straight line passing through the origin of the local coordinates, and forming an angle $\theta i$ in the counter-clockwise direction in YZ plane relative to the Z direction of the absolute coordinate system.

y-axis: a straight line passing through the origin of the local coordinates, and forming an angle of 90° in the counter-clockwise direction in YZ plane relative to z direction.

x-axis: a straight line passing through the origin of the local coordinates and perpendicular to YZ plane.

Also, Di represents a scalar amount representative of the spacing between the origins of the local coordinates of the i-th surface and the (i+1)th surface, and Ndi and vdi represent the refractive index and Abbe number, respectively, of the medium between the i-th surface and the (i+1)th surface.

Here, a spherical surface is a shape represented by the following expression:

$$z = \frac{(x^2+y^2)/Ri}{1+\{1-(x^2+y^2)/Ri^2\}^{1/2}}$$

Also, the optical system of the present invention has at least one rotation-asymmetrical aspherical surface, the shape of which is represented by the following expression:

$Z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$

The above curved surface expression has only the terms of even number orders with respect to x and therefore, the curved surface prescribed by the above curved surface expression is of a plane-symmetrical shape having yz plane as a symmetrical plane. Further, when the following condition is satisfied, it represents a shape symmetrical with respect to xz plane.

$C03 = C21 = t = 0$

Further, when $C02 = C20 \ C04 = C40 = C22/2 \ C06 = C60 = C24/3 = C42/3$ is satisfied, it represents a rotation-symmetrical shape. When the above-mentioned conditions are not satisfied, it represents a rotation-asymmetrical shape.

Each embodiment of the present invention will now be described.

Figure 1:
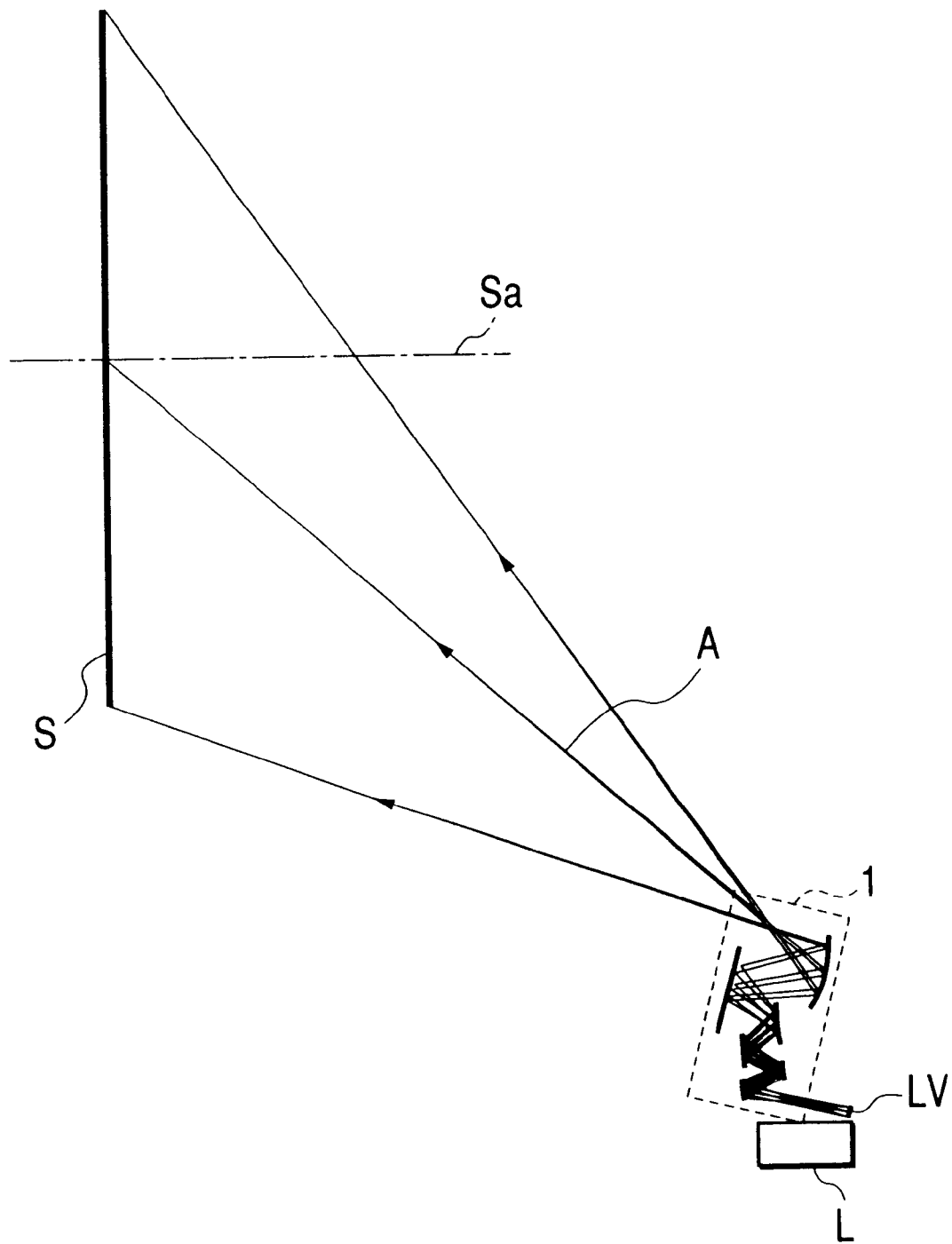
FIG. 1 shows the construction of a projection type displaying apparatus using a projection optical system according to Embodiment 1 of the present invention.

FIG. 1 is a schematic view of the essential portions of Embodiment 1 of a projection type displaying apparatus using the projection optical system of the present invention.

Figure 2:
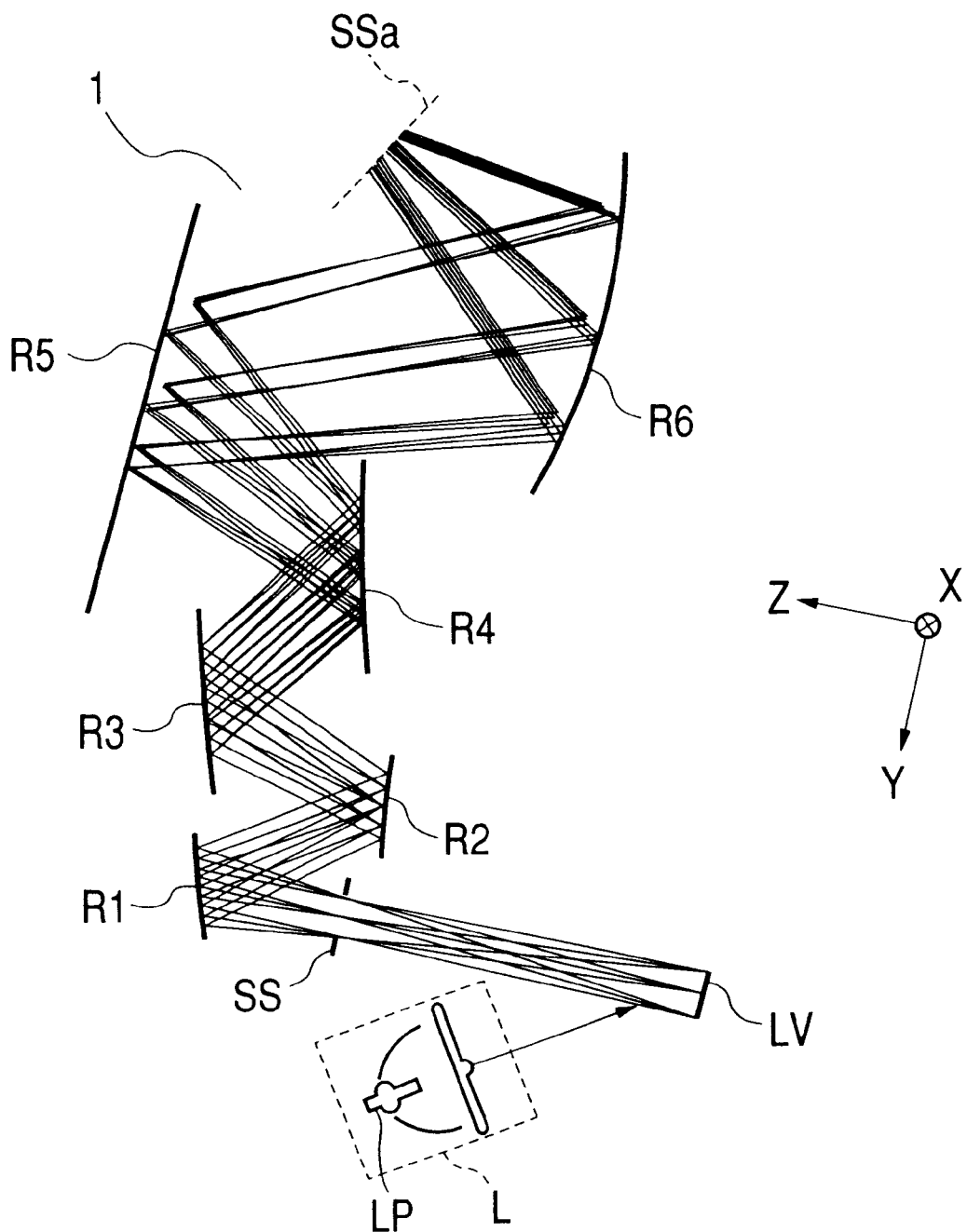
FIG. 2 shows the constructions of the reflecting optical system 1, the illumination system L and the light valve LV of the projection optical system of FIG. 1.

In FIG. 1, LV designates a light valve (image display panel) using reflection type dot matrix liquid crystal, a digital micromirror device or the like. L denotes an illumination system for illuminating the light valve LV with light. The illumination system L comprises a lamp, a condenser lens, a filter for selecting a wavelength, etc. The reference numeral 1 designates a projection optical system utilizing an off-axial system for directing light light-modulated by the light valve LV to a screen S, and forming an image on the surface of the screen S. FIG. 2 is an enlarged view of the projection optical system 1, the light valve LV and the illumination system L of FIG. 1.

The projection optical system of FIG. 2 is shown as comprising a reflecting optical system having a plurality of rotation-asymmetrical reflecting surfaces having curvatures and in which a beam from the image display panel repeats reflection by the plurality of rotation-asymmetrical reflecting surfaces and is projected onto the screen and forms a real image on the surface thereof, but the projection optical system may be designed so as to have a lens system besides the reflecting optical system shown in FIG. 2, or other reflecting optical system.

In FIGS. 1 and 2, the reflecting optical system 1 includes a stop SS and six reflecting surfaces, i.e., a concave mirror R1, a convex mirror R2, a concave mirror R3, a convex reflecting surface R4, a convex mirror R5 and a concave mirror R6, in the order of passage of the ray from the light valve LV. All reflecting surfaces are surfaces symmetrical with respect only to YZ plane. An image based on the light valve LV is intermediately formed between the convex mirror R5 and the concave mirror R6, and the stop SS is imaged at a position SSa near the concave mirror R6. That is, the pupil is imaged near the concave mirror R6. This position SSa becomes the pupil of the screen S side. The stop SS is once imaged as a real image by the optical system of the screen S side, and the imaging magnification at this time is a negative magnification. Thus, the present embodiment adopts a construction in which the image of the stop SS is formed at a negative magnification by the optical system (reflecting surfaces R1 to R5) more adjacent to the screen S than the position of the stop, thereby making the effective diameter of the ray on each surface small, and achieving the compactness of each optical element such as the reflecting surface and the entire optical system.

In the present embodiment, the size of the light valve LV is 10.8×19.2 mm, and the size of the screen S is 60 inches of a length to width ratio 9:16 (747×1328 mm). A normal Sa to the screen S is inclined by 42° relative to a reference axis A. The construction data of the reflecting optical system used in the present embodiment are shown below. In the construction data, the surfaces from the stop S surface to the image plane (the screen surface) are given numbers in succession.

Stop diameter 9.00

| i | Yi | Zi | θi | Di | Ndi | vdi |
|---|---|---|---|---|---|---|
| 1 | 0.00 | 0.00 | 0.00 | 32.26 | 1 | Stop |
| 2 | 0.00 | 32.26 | 17.67 | 45.33 | 1 | Reflecting surface |
| 3 | −26.22 | −4.71 | 8.29 | 46.47 | 1 | Reflecting surface |
| 4 | −41.18 | 39.28 | 17.39 | 45.51 | 1 | Reflecting surface |
| 5 | −77.79 | 12.25 | 14.50 | 59.90 | 1 | Reflecting surface |
| 6 | −102.68 | 66.73 | −2.06 | 102.23 | 1 | Reflecting surface |
| 7 | −138.37 | −29.06 | −4.71 | 980.17 | 1 | Reflecting surface |
| 8 | −635.29 | 836.51 | 12.14 |  | 1 | Image plane |

Aspherical shape

| | | | | | | |
|---|---|---|---|---|---|---|
| R1 surface | C02 = | −4.49687e-03 | C20 = | −4.86771e-03 | | |
| | C03 = | 5.69210e-06 | C21 = | 1.24178e-05 | | |
| | C04 = | −1.51960e-07 | C22 = | −2.54883e-07 | C40 = | −1.42672e-07 |
| | C05 = | −2.46793e-10 | C23 = | −4.09563e-09 | C41 = | −1.82622e-09 |
| | C06 = | −6.21629e-11 | C24 = | −1.54069e-10 | C42 = | −2.02039e-10 |
| | C60 = | −7.59135e-12 | | | | |
| R2 surface | C02 = | −3.53809e-03 | C20 = | −3.25444e-03 | | |
| | C03 = | 4.17013e-05 | C21 = | 1.32567e-04 | | |
| | C04 = | −9.98623e-07 | C22 = | −1.51987e-06 | C40 = | −4.45744e-07 |
| | C05 = | 1.30709e-08 | C23 = | −9.55779e-09 | C41 = | −1.73083e-08 |
| | C06 = | −5.65529e-10 | C24 = | −6.97342e-11 | C42 = | −4.30573e-10 |
| | C60 = | −2.13646e-11 | | | | |

-continued

| | | | | | | |
|---|---|---|---|---|---|---|
| R3 surface | C02 = | −1.30032e-03 | C20 = | −2.56607e-04 | | |
| | C03 = | 4.43561e-06 | C21 = | 1.32174e-04 | | |
| | C04 = | −2.62553e-08 | C22 = | 1.00960e-06 | C40 = | 7.68176e-07 |
| | C05 = | 1.74031e-09 | C23 = | 8.37695e-09 | C41 = | 1.20650e-08 |
| | C06 = | −1.36927e-11 | C24 = | 1.74384e-10 | C42 = | 2.96519e-10 |
| | C60 = | 6.13742e-11 | | | | |
| R4 surface | C02 = | −1.66701e-03 | C20 = | −3.65447e-03 | | |
| | C03 = | 2.01207e-05 | C21 = | 2.02910e-04 | | |
| | C04 = | 4.13482e-07 | C22 = | −1.01346e-06 | C40 = | 5.37830e-07 |
| | C05 = | 1.69426e-10 | C23 = | 2.13758e-08 | C41 = | 2.22534e-09 |
| | C06 = | −1.10132e-10 | C24 = | −4.19386e-10 | C42 = | −3.64616e-10 |
| | C60 = | −2.17667e-10 | | | | |
| R5 surface | C02 = | −3.70314e-04 | C20 = | −2.44681e-03 | | |
| | C03 = | 1.34521e-06 | C21 = | 3.26044e-05 | | |
| | C04 = | 3.10235e-07 | C22 = | 1.40380e-08 | C40 = | −7.66155e-08 |
| | C05 = | 1.21219e-09 | C23 = | 1.33276e-08 | C41 = | 2.02925e-09 |
| | C06 = | −7.87877e-11 | C24 = | 1.31044e-10 | C42 = | 5.22698e-11 |
| | C60 = | −1.13702e-11 | | | | |
| R6 surface | C02 = | 3.77979e-03 | C20 = | 5.98505e-03 | | |
| | C03 = | −1.57953e-05 | C21 = | −3.81115e-05 | | |
| | C04 = | 9.47079e-08 | C22 = | 1.91802e-07 | C40 = | −2.34207e-07 |
| | C05 = | 5.93045e-10 | C23 = | 1.52327e-09 | C41 = | 4.88138e-09 |
| | C06 = | −1.73838e-11 | C24 = | −7.00697e-12 | C42 = | −5.86393e-11 |
| | C60 = | 1.15306e-11 | | | | |

The optical action in the optical system of the present embodiment will now be described. Light emitted from the light source LP of the illumination system L passes through a condenser lens, a color filter, etc., not shown, and illuminates the light valve LV, and the light light-modulated by the light valve LV is condensed by the reflecting optical system 1 and is directed to the screen, on which an image based on the light valve LV is displayed.

Figure 3:
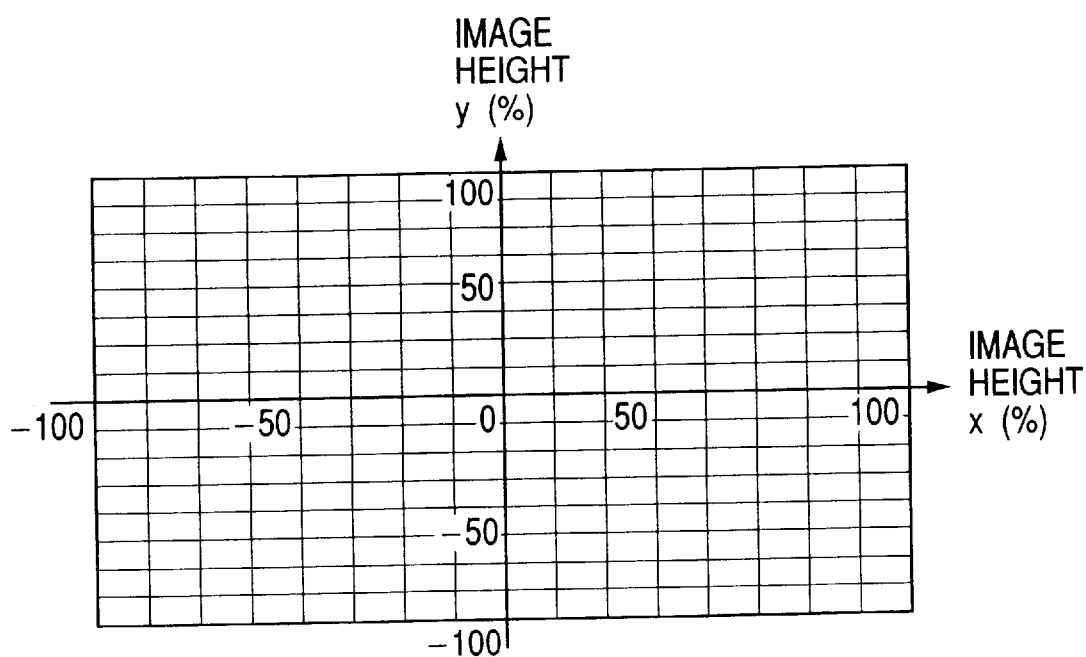
FIG. 3 is an illustration showing the distortion of the projection optical system according to Embodiment 1 of the present invention.
Figure 4:
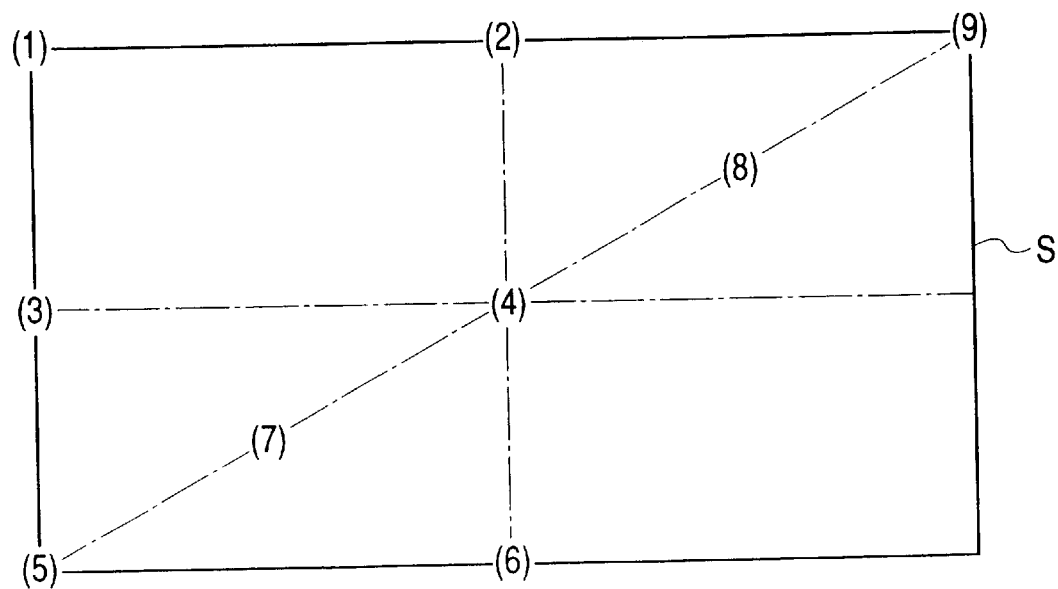
FIG. 4 is an illustration showing the evaluation position on a screen according to the present invention.
Figure 5:
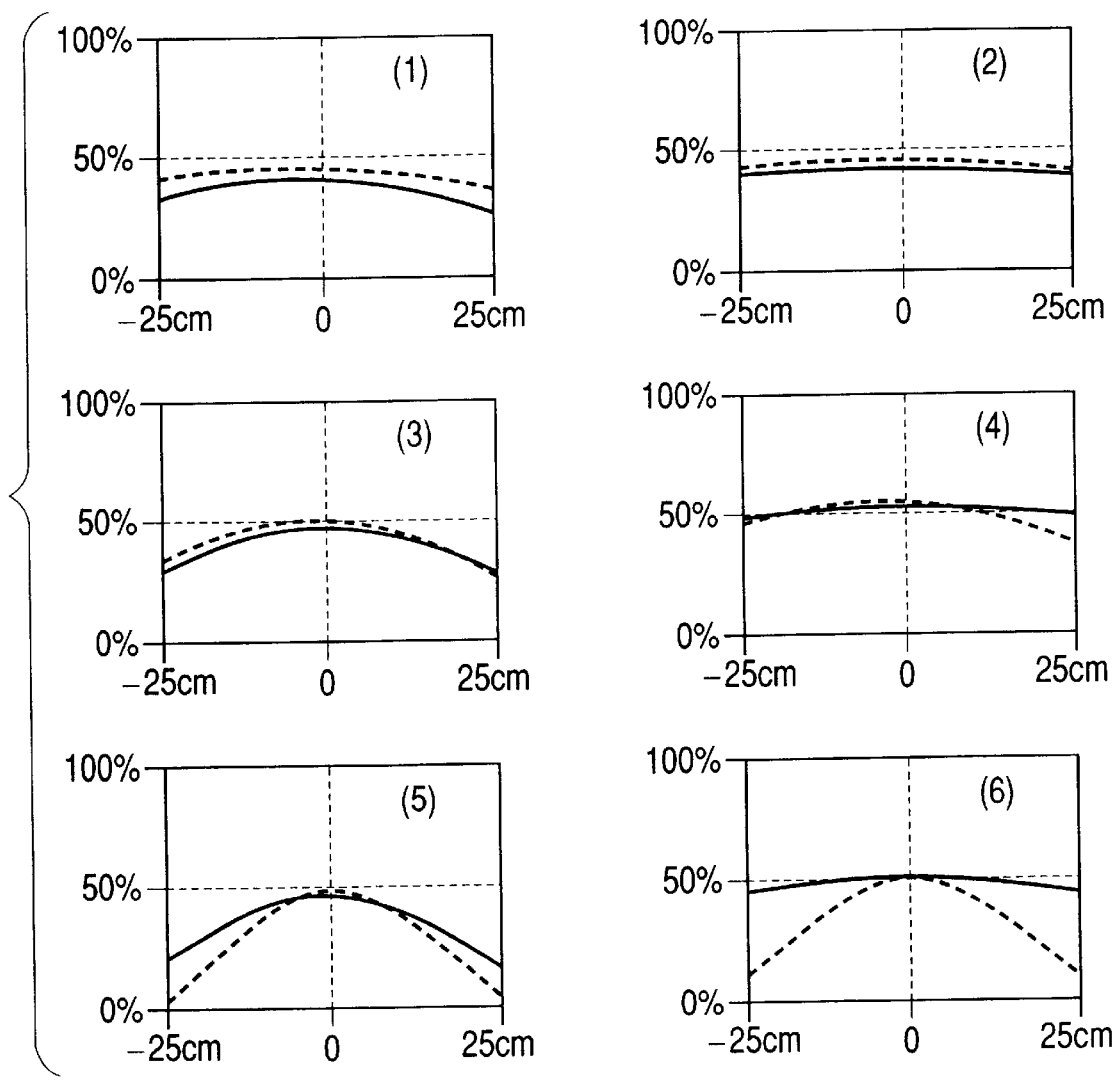
FIG. 5 is an illustration showing the defocus characteristic of the projection optical system according to Embodiment 1 of the present invention.

FIG. 4 shows an evaluating position for evaluating the defocus characteristics and the quantity of marginal light on the screen S. The state of the distortion of the projection optical system 1 of the present embodiment is shown in FIG. 3, and the defocus characteristics at the image positions (1) to (6) on the screen S are shown in FIG. 5. As can be seen from FIG. 3, the projection optical system 1 of the present embodiment is free of great distortion, and has little asymmetrical distortion. The individual graphs of FIG. 5 representing the defocus characteristics show MTF of the frequency 1 line/mm within a range of −25 cm to 25 cm from the screen on the reference axis, and the solid line represents the contrast value in y direction in the local coordinates on the screen, and the broken line represents the contrast value in x direction in the local coordinates on the screen. From this figure, it; can be seen that at each image position, MTF has a peak on the screen, that is, is focused on the screen. Also, at each image position, the contrast value secures approximately 50%.

Also, the ratios of quantity of light at positions (5), (7), (4), (8) and (9) on the diagonal in the screen shown in FIG. 4 are as follows (it is to be understood that the quantity of light at the position (4) is 100).

(5)=94.8, (7)=95.3, (4)=100, (8)=94.2, (9)=91.8

Thus, little or no difference is seen in the distribution of quantity of light.

In the reflecting optical system used in the present embodiment, the focal lengths f1(0) and f1(90) at azimuths 0 degree and 90 degrees evolved about the reference axis and the principal point positions H1(0) and H1(90) on the light valve LV side are calculated as follows. However, the azimuth 0 degree is an azimuth including image positions (2), (4) and (6) in FIG. 4, and the azimuth 90 degrees is an azimuth including image positions (3) and (4) in FIG. 4. Also, the principal point positions have the concave mirror R1 as the reference, and the direction in which the light travels is defined as positive.

f1(0)=−17.83, f1(90)=−13.7, H1(0)=−132.72, H1(90)=−128.764

Hence, the values by the aforementioned expressions (1) and (2) are:

$$|(H(90)-H(0))/H(0)|=0.03<0.2 \tag{1}$$

$$|1-\cos(42°)\cdot f(0)/f(90)|=0.03<0.2 \tag{2}$$

(where 42° is the angle formed by the normal Sa to the screen S and the reference axis A.)

Figure 12:
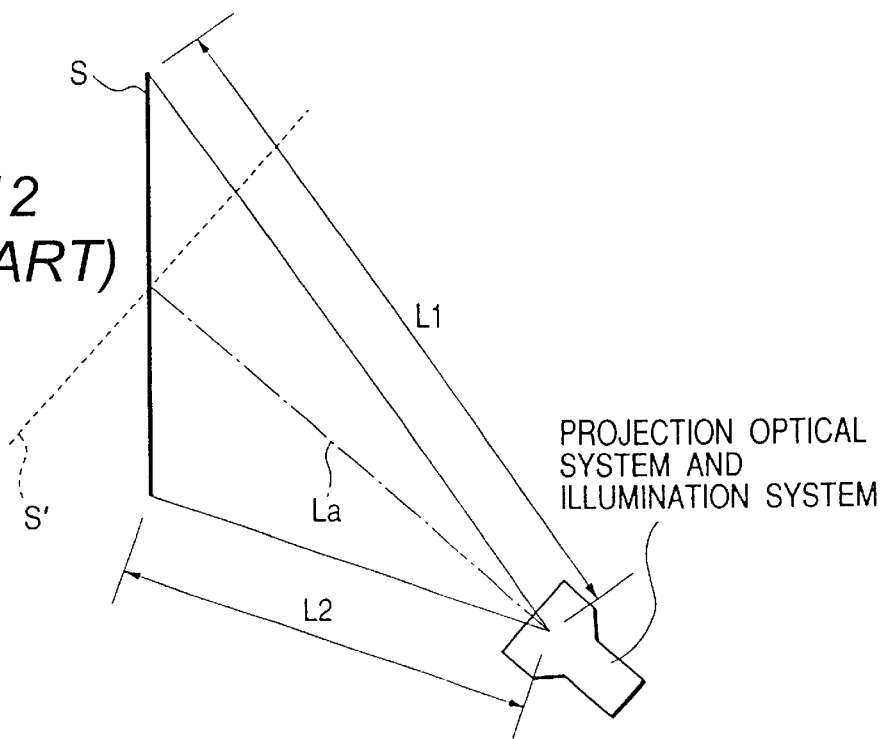
FIG. 12 is a conceptional view of an optical system according to the prior art which has obliquely projected.
Figure 13:
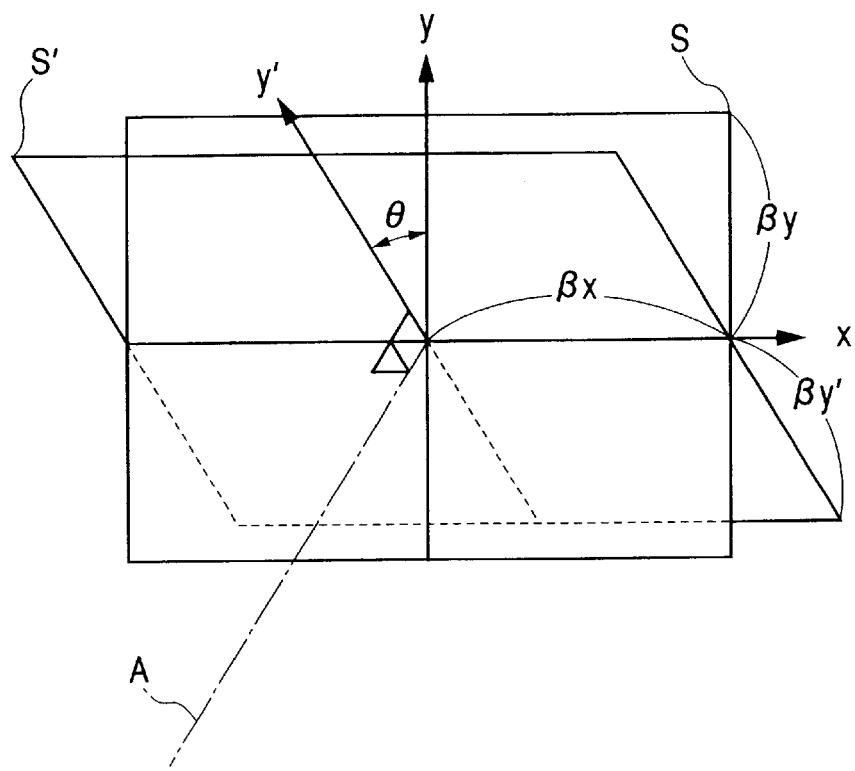
FIG. 13 is an illustration showing the relation of magnification when oblique projection is effected.
Figure 14:
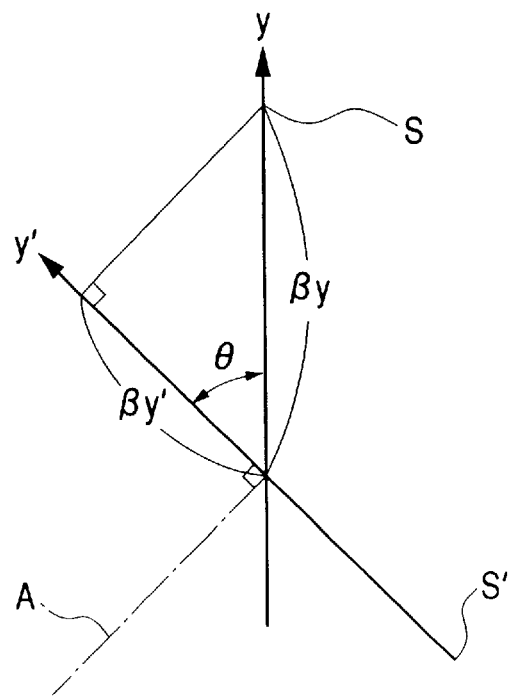
FIG. 14 is an illustration showing the relation of magnification when oblique projection is effected.
Figure 15:
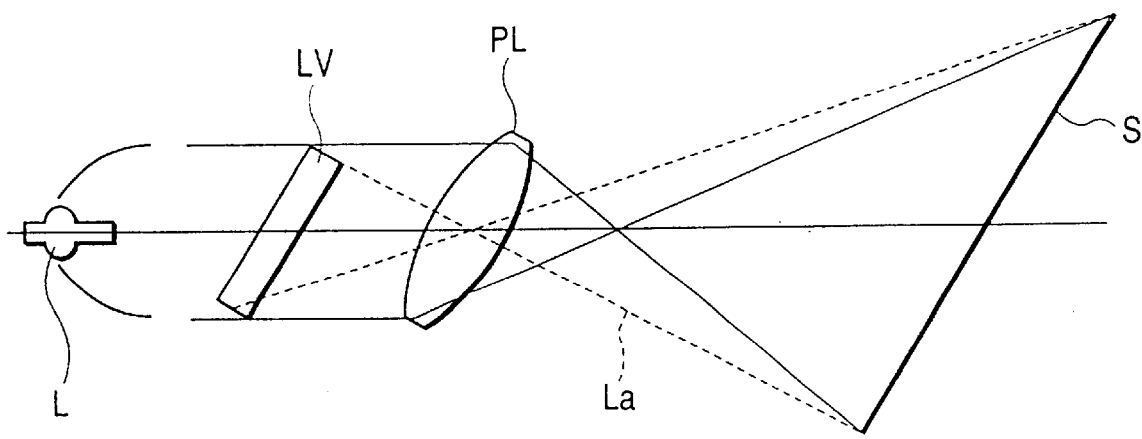
FIG. 15 is an illustration showing an oblique projection optical system according to the prior art.
Figure 16:
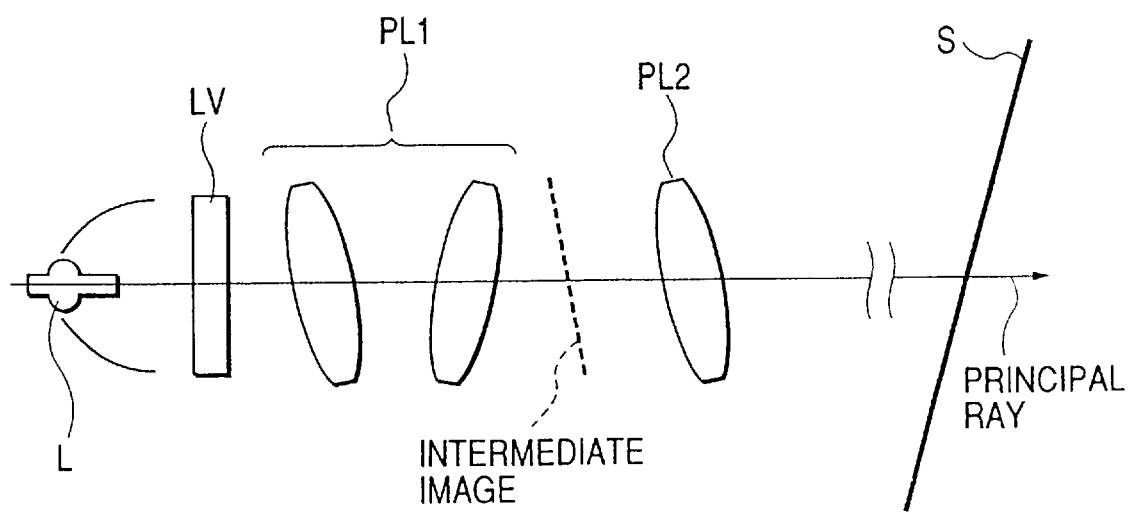
FIG. 16 is an illustration showing an oblique projection optical system according to the prior art.

In the present embodiment, the light valve LV is not shifted or tilted relative to the reference axis A and therefore, it is desirable that azimuth dependency be small when the reflecting optical system 1 is viewed from the light valve LV, that is, the principal point position have small azimuth dependency. In the present embodiment, as can be seen from the value of expression (1), it can be said that the azimuth dependency of the principal point position is small. If the value of expression (1) is great, asymmetrical aberration will occur in a great deal, and this is not preferable from the viewpoint of aberration correction, and if the value of expression (1) becomes 0.2 or greater, aberration correction will become difficult. FIG. 13 shows the screen portion in the state of FIG. 12. In FIG. 13, the letter A designates the reference axis, the letter S denotes the inclined screen, the letter S' designates a plane perpendicular to the reference axis A, and the screen S and the plane S' are inclined by an angle θ. Originally, the image plane of the light valve LV enlarged and projected by the reflecting optical system 1 is imaged on the plane S'. As is disclosed in Japanese Patent Application Laid-Open No. 09-5650, when an evaluation plane is evolved about the reference axis A and is evaluated by the plane S' perpendicular to the reference axis, the paraxial amount exhibits the same value for an azimuth ξ and an azimuth ξ+180°. Therefore, the paraxial amount represented in Japanese Patent Application Laid-Open No. 09-5650 does not cause the inclination of the image plane. That is, it can be construed that an aberration of the same kind as curvature of image field, and more particularly, an aberration in which the focus position deviates as it goes away from the line of intersection between the screen S and the plane S' occurs and therefore the image plane becomes inclined. When it is construed so, a magnification βy' in y direction on the plane S' which is the evaluation plane can be regarded as a magnification βy on the screen S having been projected and therefore, in order that the length to width ratio may be kept on the screen S, the following relation need be satisfied:

βy=βy'/cos θ=βx(see FIG. 14)

Hence, $$\beta y'/\beta x = \cos\theta = \frac{(f(0)-ss'(0))/f(0)}{(f(90)-ss'(90))/f(90)} = \frac{f(90)}{f(0)}$$

Here, SS'(0) and SS'(90) are the distances from the principal point position of the reflecting optical system on the screen S side to the screen S at azimuths 0° and 90°, respectively. In the above expression, SS'(0) and SS'(90) are approximated as SS'(0)≅SS'(90), SS'(0)>>f(0) and SS'(90) >>f(90) because in the present embodiment, SS'(0)=1034 and SS'(90)=991. That is, it is the condition under which the length to width ratio is kept that the value of expression (2) is small. If the value of expression (2) becomes greater than 0.2, distortion will become great and aberration correction will become difficult. Also, when the stop is placed on the pupil SSa of the screen side, brightness will differ between the upper portion and the lower portion of the screen because the length of an optical path passing through the upper portion of the screen and the length of an optical path passing through the lower portion of the screen differ from each other, and this is not preferable.

In the present embodiment, design is made such that at least one of the aforementioned expressions (1) and (2) is satisfied.

While in the present embodiment, the stop is provided between the display panel (light valve) LV and the reflecting optical system 1, the present invention is not restricted thereto. While in the present embodiment, the rotation-asymmetrical reflecting surfaces are used as the surface reflecting surfaces, use may be made of an optical block having a rotation-asymmetrical reflecting surface formed on the surface of a transparent member as disclosed in Japanese Patent Application Laid-Open No. 8-292372, Japanese Patent Application Laid-Open No. 9-222561, Japanese Patent Application Laid-Open No. 9-258105, etc. Further, a plurality of rotation-asymmetrical surface reflecting surfaces may be integrally molded. While in the present embodiment, six rotation-asymmetrical reflecting surfaces are used, the number of the reflecting surfaces is not limited to six, but may be arbitrary. However, from the viewpoint of aberration correction, it is desirable that the number of the reflecting surfaces be at least three. Also, while the rotation-asymmetrical reflecting surfaces are of a shape symmetrical with respect to a plane, this is not restrictive.

Figure 6:
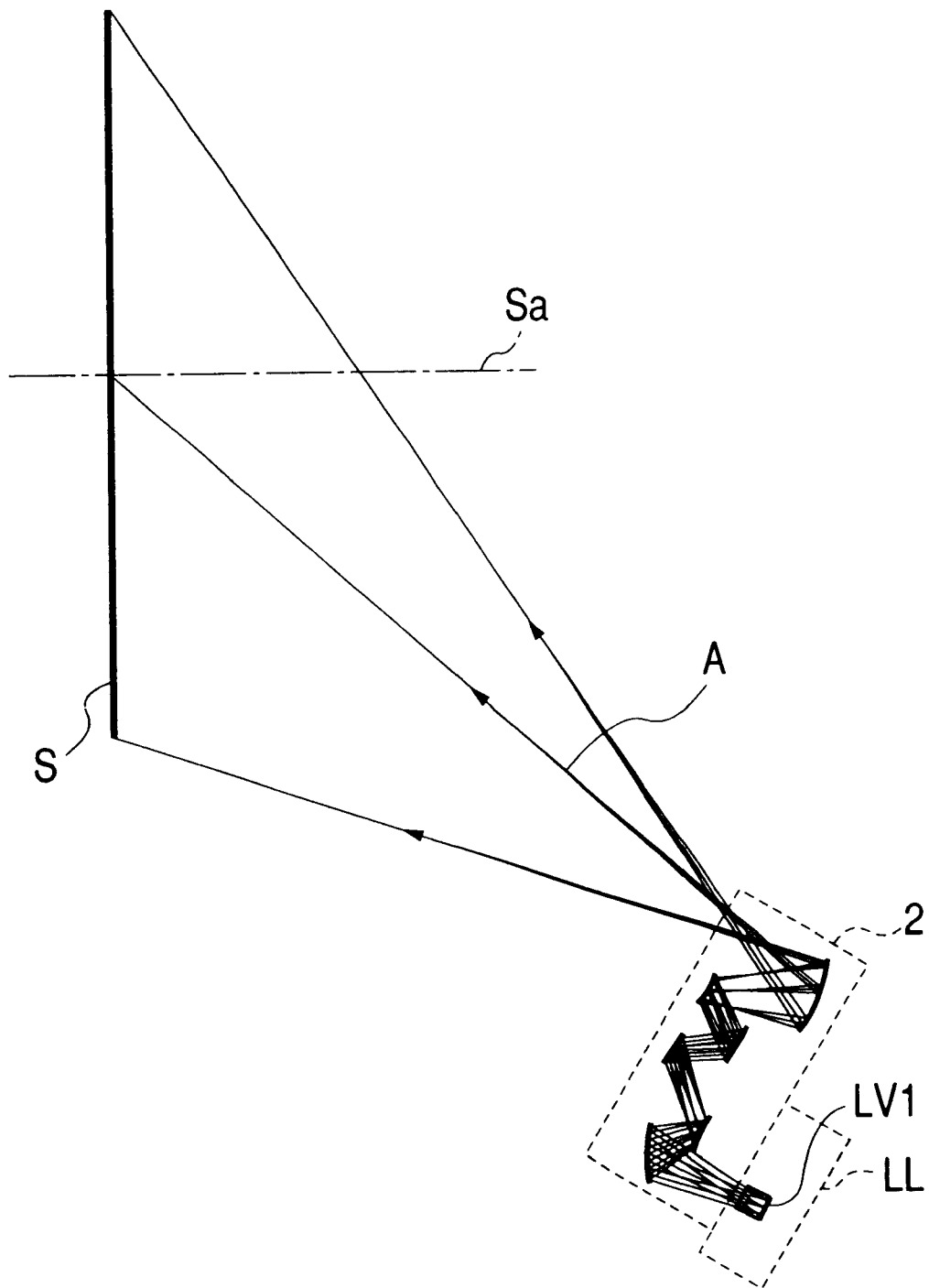
FIG. 6 shows the construction of a projection type displaying apparatus using a projection optical system according to Embodiment 2 of the present invention.
Figure 7:
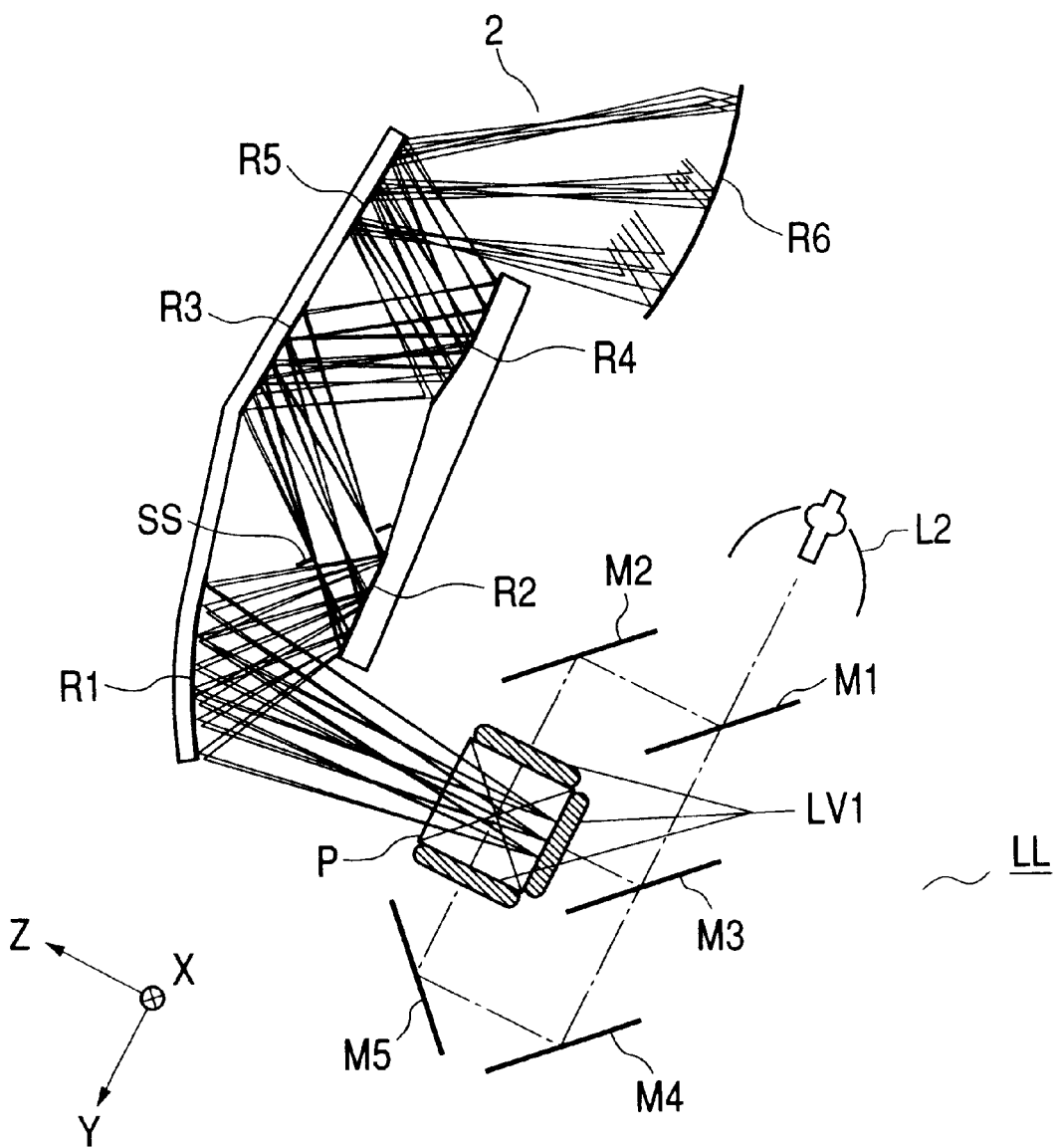
FIG. 7 shows the constructions of the reflecting optical system 2 and the illumination system of the projection optical system according to Embodiment 2 of the present invention.

FIG. 6 is a schematic view of the essential portions of Embodiment 2 of the projection type displaying apparatus of the present invention. In FIG. 6, LL designates an illumination system for illuminating light valves LV1 with light. The reference numeral 2 denotes a reflecting optical system utilizing an off-axial system for projecting the light light-modulated by the light valves LV1 onto a screen S. FIG. 7 is a detailed view of the reflecting optical system 2 and the illumination system LL of FIG. 6. In FIGS. 6 and 7, the light valves LV1 comprise transmission type dot matrix liquid crystal or the like, M(M1 to M5) designates plane mirrors or dichroic mirrors, L2 denotes a light source, and P designates a dichroic prism. SS denotes a stop.

In FIGS. 6 and 7, the reflecting optical system 2 is comprised of six reflecting surfaces, i.e., a concave mirror R1, a convex mirror R2, the stop SS, a concave mirror R3, a convex reflecting surface R4, a convex mirror R5 and a concave mirror R6, in the order of passage of a ray from the dichroic prism P. All reflecting surfaces are surfaces symmetrical with respect only to YZ plane. An image based on the light valves LV1 is intermediately formed between the convex mirror R5 and the concave mirror R6, and the stop SS is imaged near the concave mirror R6. That is, a pupil is imaged near the concave mirror R6. By thus adopting a construction in which the image of the stop SS is formed at a negative magnification by the optical system (R3 to R6) more adjacent to the screen than the stop position, the effective diameter of the ray on each surface is made small and the compactness of each optical element and the entire optical system is achieved.

Also, the concave mirror R1, the concave mirror R3, the convex mirror R5, the convex mirror R2 and the convex reflecting surface R4 are integrally formed by molding or the like.

In the present embodiment, the size of each light valve LV1 is 12.82×22.8 mm, and the size of the screen S is 60 inches (747×1328 mm) of the length to width ratio 9:16. Also, a normal Sa to the screen S is inclined by 42° relative to the reference axis A. The construction data of the reflecting optical system used in the present embodiment will be shown below.

Stop Elliptical shape Major axis 10 mm, Minor Axis 8 mm
Object side NAO. 14

| i | Yi | Zi | θi | Di | Ndi | νdi | |
|---|------|--------|-------|--------|---------|------|-------------------|
| 1 | 0.00 | 0.00 | 0.00 | 40.00 | 1.51633 | 0.00 | Refracting surface |
| 2 | 0.00 | 40.00 | 0.00 | 94.44 | 1 | | Refracting surface |
| 3 | 0.00 | 134.44 | 24.10 | 62.00 | 1 | | Reflecting surface |
| 4 | −46.22 | 93.12 | 3.20 | 20.00 | 1 | | Reflecting surface |
| 5 | −59.55 | 108.03 | −41.80 | 66.05 | 1 | | Stop |
| 6 | −103.58 | 157.27 | −5.43 | 65.00 | 1 | | Reflecting surface |
| 7 | −137.00 | 101.52 | −1.54 | 60.95 | 1 | | Reflecting surface |
| 8 | −171.10 | 152.04 | −4.02 | 112.93 | 1 | | Reflecting surface |
| 9 | −220.57 | 50.52 | 5.48 | 969.57 | 1 | | Reflecting surface |
| 10 | −466.94 | 969.57 | 26.99 | | 1 | | Image plane |

Aspherical shape

| R1 surface | C02 = | −3.44101e-03 | C20 = | −4.588071e-03 | | |
|------------|-------|--------------|-------|---------------|-------|---------------|
| | C03 = | 3.00440e-07 | C21 = | 2.78030e-06 | | |
| | C04 = | −7.01756e-08 | C22 = | −1.74221e-07 | C40 = | −1.12497e-07 |

-continued

|  |  |  |  |  |  |  |
|---|---|---|---|---|---|---|
|  | C05 = | −1.27294e-10 | C23 = | 8.12098e-11 | C41 = | 3.12082e-10 |
|  | C06 = | −3.83615e-12 | C24 = | −1.10477e-11 | C42 = | −1.44544e-11 |
|  | c60 = | −7.14330e-12 |  |  |  |  |
| R2 surface | C02 = | −1.77378e-03 | C20 = | −5.41577e-03 |  |  |
|  | C03 = | 5.41708e-06 | C21 = | 7.40562e-05 |  |  |
|  | C04 = | −1.76494e-07 | C22 = | −8.51854e-07 | C40 = | −3.39088e-07 |
|  | C05 = | 1.36936e-09 | C23 = | 1.39948e-08 | C41 = | 1.57616e-08 |
|  | C06 = | −1.31153e-11 | C24 = | −1.03951e-10 | C42 = | −3.22676e-10 |
|  | c60 = | 5.17060e-11 |  |  |  |  |
| R3 surface | C02 = | −4.06842e-04 | C20 = | 4.21014e-04 |  |  |
|  | C03 = | −1.71357e-05 | C21 = | 5.33947e-05 |  |  |
|  | C04 = | 1.45062e-07 | C22 = | −1.23899e-07 | C40 = | 5.80084e-07 |
|  | C05 = | −5.71252e-10 | C23 = | 6.97038e-09 | C41 = | 1.25680e-08 |
|  | C06 = | 6.89521e-13 | C24 = | 3.16751e-12 | C42 = | 2.25270e-10 |
|  | c60 = | 8.97051e-11 |  |  |  |  |
| R4 surface | C02 = | 1.20784e-03 | C20 = | 2.06883e-03 |  |  |
|  | C03 = | −1.40533e-05 | C21 = | 4.44511e-05 |  |  |
|  | C04 = | 1.42042e-07 | C22 = | −1.75304e-09 | C40 = | 1.84753e-07 |
|  | C05 = | 9.01218e-10 | C23 = | 1.46871e-09 | C41 = | 2.53895e-10 |
|  | C06 = | −4.31366e-12 | C24 = | −8.79849e-12 | C42 = | −1.82599e-12 |
|  | c60 = | −4.30585e-12 |  |  |  |  |
| R5 surface | C02 = | 2.70769e-03 | C20 = | 1.00819e-03 |  |  |
|  | C03 = | 5.68901e-06 | C21 = | 3.16537e-05 |  |  |
|  | C04 = | 4.86535e-07 | C22 = | −9.16386e-08 | C40 = | 4.00354e-08 |
|  | C05 = | −1.21193e-09 | C23 = | −6.83278e-10 | C41 = | 1.45772e-09 |
|  | C06 = | 5.47807e-12 | C24 = | −1.36131e-10 | C42 = | −9.34573e-11 |
|  | c60 = | −7.03592e-13 |  |  |  |  |
| R6 surface | C02 = | 3.62336e-03 | C20 = | 5.17427e-03 |  |  |
|  | C03 = | −1.38973e-05 | C21 = | −2.14069e-05 |  |  |
|  | C04 = | 1.47678e-07 | C22 = | 1.65634e-07 | C40 = | −4.61086e-08 |
|  | C05 = | −1.05417e-09 | C23 = | −7.54144e-10 | C41 = | 3.87584e-10 |
|  | C06 = | 5.56347e-12 | C24 = | 5.18352e-12 | C42 = | −1.00483e-12 |
|  | c60 = | 7.76995e-12 |  |  |  |  |

Figure 8:
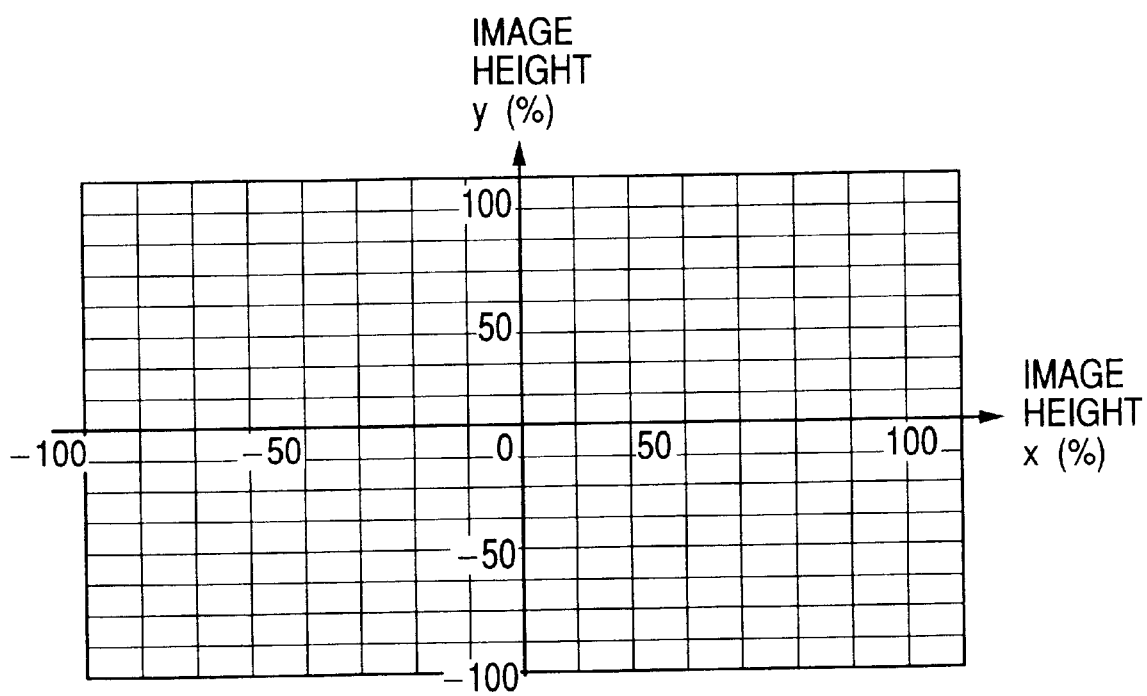
FIG. 8 is an illustration showing the distortion of the projection optical system according to Embodiment 2 of the present invention.
Figure 9:
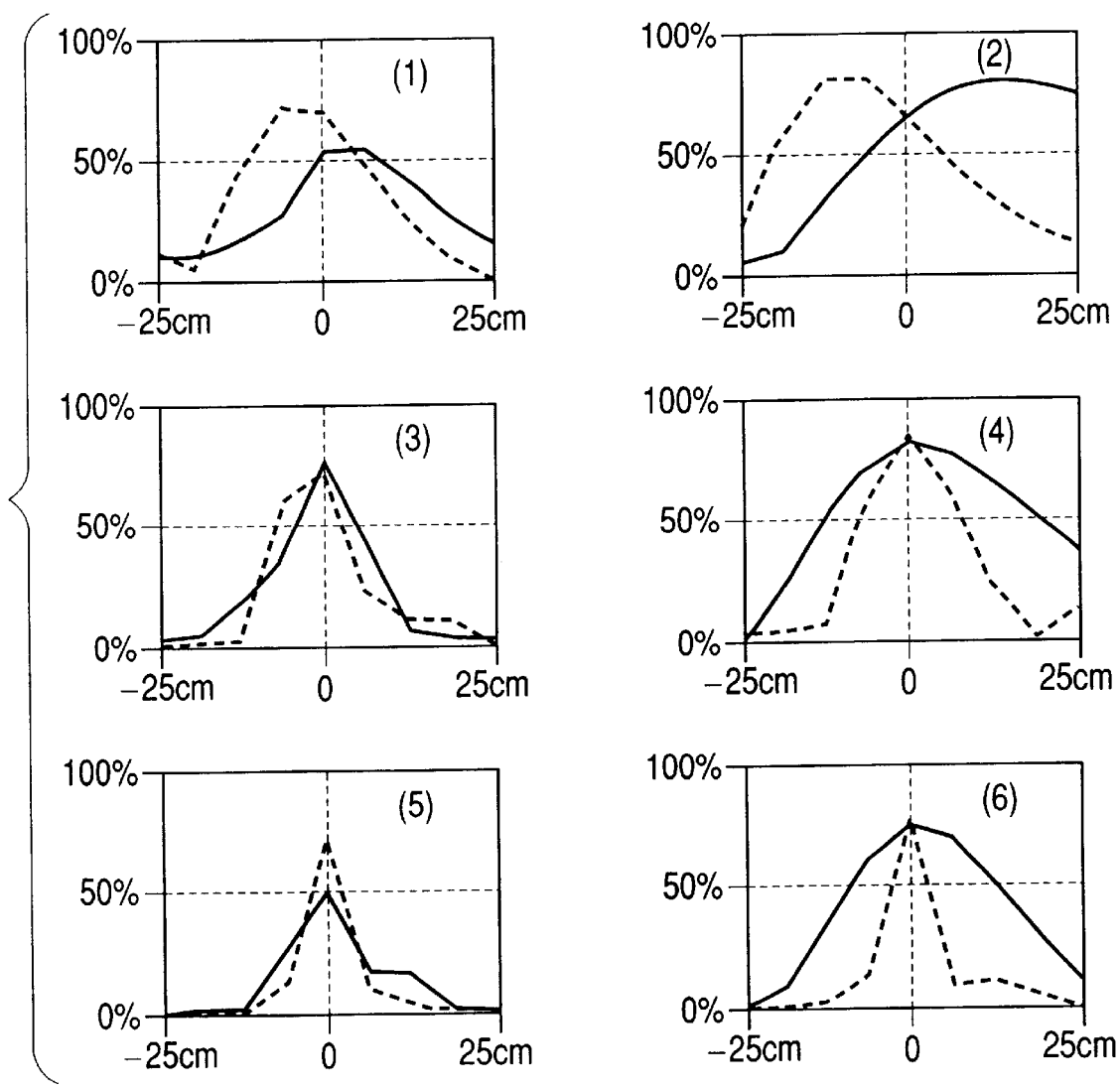
FIG. 9 is an illustration showing the defocus characteristic of the projection optical system according to Embodiment 2 of the present invention.

The optical action in the present embodiment will now be described. Light emitted from the light source L2 of the illumination system LL passes the plurality of reflecting mirrors M and is divided into three primary colors R(red), G(green) and B(blue). The color lights R, G and B pass through the light valves LV1 corresponding thereto, are combined by the dichroic prism P and directed onto the screen S by the reflecting optical system 2. An image (color image) based on the light valves LV1 is displayed on the screen by the reflecting optical system. The state of the distortion of the projection optical system 2 of the present embodiment is shown in FIG. 8, and the defocus characteristics at image positions (1) to (6) on the screen S in FIG. 4 are shown in FIG. 9. The projection optical system 2 of the present embodiment, as can be seen from FIG. 8, has no great distortion and has little asymmetrical distortion. The individual graphs of FIG. 9 representing the defocus characteristics show MTF of frequency 1 line/mm within a range of −25 cm to 25 cm from the screen on the reference axis, and solid line represents the contrast value in y direction in the local coordinates on the screen, and broken line represents the contrast value in x direction in the local coordinates on the screen. From this figure, it can be seen that at each image position, MTF has a peak on the screen, that is, is focused on the screen. Also, at each image position, the contrast value secures approximately 50%.

Also, the ratios of quantity of light at image positions (5), (7), (4), (8) and (9) on the diagonal in the screen shown in FIG. 4 are as follows (it is to be understood that the quantity of light at the position (4) is 100).

(5)=96.5, (7)=101.2, (4)=100, (8)=102.9, (9)=105.5

Thus, little or no difference is seen in the distribution of quantity of light.

In the reflecting optical system used in the present embodiment, the focal lengths f1(0) and f1(90) at azimuths 0 degree and 90 degrees evolved about the reference axis and the principal point positions H1(0) and H1(90) on the light valves LV1 side are calculated as follows. However, the azimuth 0 degree is an azimuth including image positions (2), (4) and (6) in FIG. 4, and the azimuth 90 degrees is an azimuth including image positions (3) and (4) in FIG. 4. Also, the principal point positions have the concave mirror R1 as the reference, and the direction in which the light travels is defined as positive.

f1(0)=−19.81, f1(90)=−15.25, H1(0)=−140.15, H1(90)=−135.79

Hence, $$|(H(90)-H(0))/H(0)|=0.03<0.2 \qquad (1)$$

$$|1-\cos(42°) \cdot f(0)/f(90)|=0.03<0.2 \qquad (2)$$

(where 42° is the angle formed by the normal Sa to the screen S and the reference axis A).

In the present embodiment, the light valves LV1 are not shifted or tilted relative to the reference axis A and therefore, it is desirable that azimuth dependency be null when the reflecting optical system 2 is viewed from the light valves LV1, that is, the principal point position have no azimuth dependency. In the present embodiment, as can be seen from the value of expression (1), it can be said that the azimuth dependency of the principal point position is small. If the value of expression (1) is great, asymmetrical aberration will occur in a great deal, and this is not preferable from the viewpoint of aberration correction, and if the value of expression (1) becomes 0.2 or greater, aberration correction will become difficult. Also, the value of expression (2) is small and therefore, the length to width ratio on the screen is; kept. If the value of expression (2) becomes greater than 0.2, distortion will become great and aberration correction will become difficult. Also, when the stop is placed on the pupil of the screen S side, brightness will differ between the upper portion and the lower portion of the screen because the length of an optical pass passing through the upper portion of the screen and the length of an optical path passing through the lower portion of the screen differ from each other.

While in the present embodiment, the stop SS is provided between the rotation-asymmetrical reflecting surface R2 and the rotation-asymmetrical reflecting surface R3, the present invention is not restricted thereto. While in the present embodiment, the rotation-asymmetrical reflecting surfaces are used as the surface reflecting surfaces, use may be made of an optical block having a rotation-asymmetrical reflecting surface formed on the surface of a transparent member as disclosed in Japanese Patent Application Laid-Open No. 8-292372, Japanese Patent Application Laid-Open No. 9-222561, Japanese Patent Application Laid-Open No. 9-258105, etc.

Further, while in the present embodiment, the concave mirror R1, the concave mirror R3, the convex mirror R5, the convex mirror R2 and the convex reflecting surface R4 are integrally formed by molding or the like, this is not restrictive. While in the present embodiment, six rotation-asymmetrical reflecting surfaces are used, the number of the reflecting surfaces is not limited to six, but may be arbitrary. However, from the viewpoint of aberration correction, it is desirable that the number of the reflecting surfaces be at least three. Also, while the rotation-asymmetrical reflecting surfaces are of a shape symmetrical with respect to a certain plane, this is not restrictive.

Figure 10:
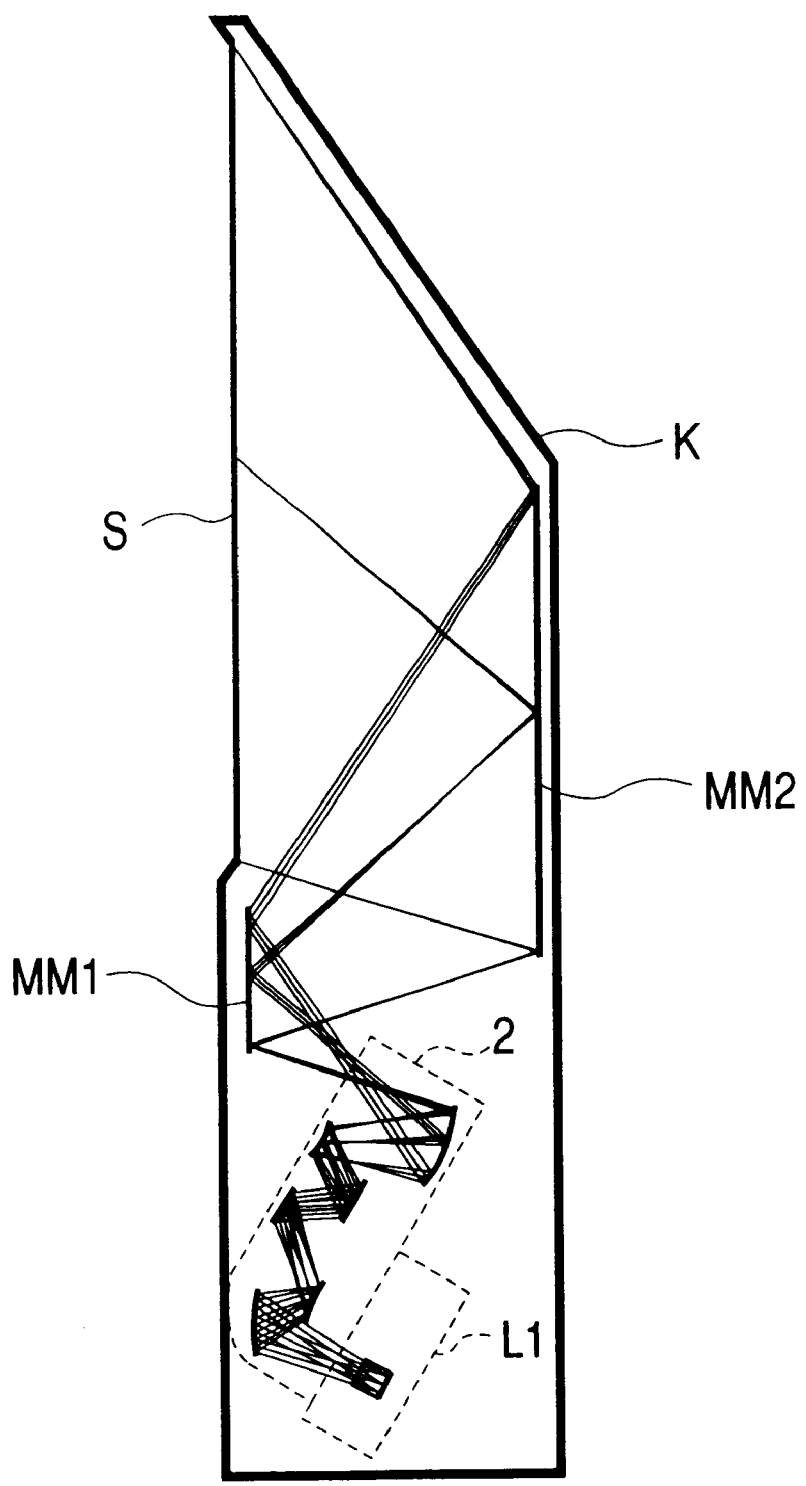
FIG. 10 is an illustration showing a projection type displaying apparatus according to Embodiment 3 of the present invention.
Figure 11:
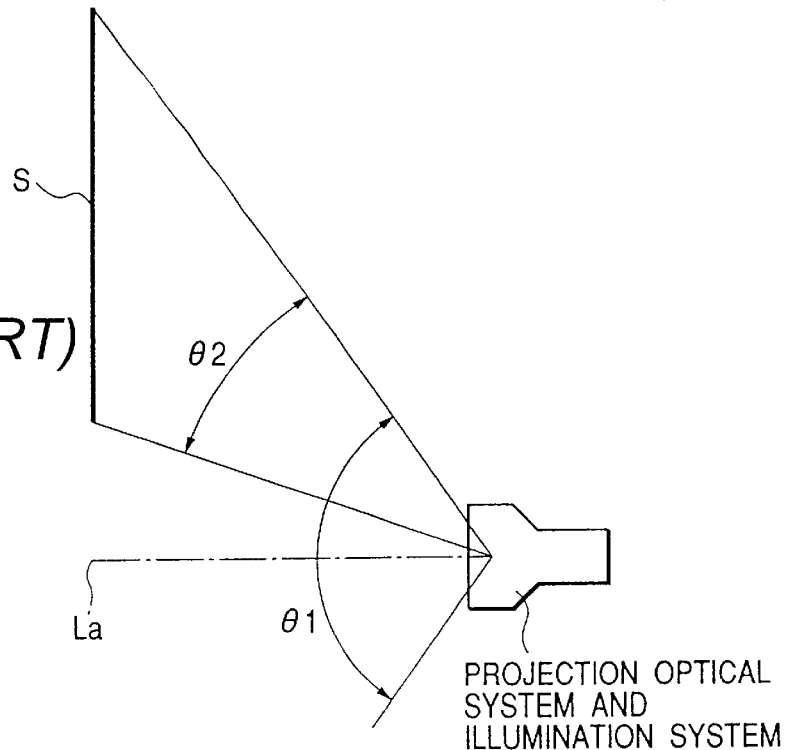
FIG. 11 is a conceptional view of a shift optical system according to the prior art.

FIG. 10 is a schematic view of the essential portions of Embodiment 3 of the projection type displaying apparatus of the present invention. This embodiment differs from Embodiment 2 of FIG. 6 in that a projection optical system is provided in a case K provided with a transmission type screen S in the front thereof, and is applied to a back projection type displaying apparatus. A beam from a reflecting optical system 2 is turned back by a plane mirror MM1 and a plane mirror MM2 and is projected onto the transmission type screen S. By thus using a projection optical system which obliquely projects the beam onto the screen S, the lateral depth of the apparatus is made small. In this case, the greater is the angle between the reference axis and the screen, the more can be reduced the lateral depth of the apparatus.

While in the present embodiment, the optical path is bent by the two plane mirrors MM1 and MM2, the present invention is not restricted thereto, but more than two mirrors may be used.

The reflecting mirrors in each embodiment described above are disposed such that the concave mirror R1, convex mirror R2, concave mirror R3, convex mirror R4, convex mirror R5 and concave mirror R6 are successively disposed on the route of the beam from the light valve side. In other words, the reflecting mirrors are so disposed as to have positive refractive power, negative refractive power, negative refractive power, positive refractive power, negative refractive power and positive refractive power in succession from the screen side. The present invention, however, is not limited to the above arrangement of the reflecting mirrors but is also accomplished by such arrangement of the reflecting mirrors that the concave mirror, concave mirror, convex mirror, concave mirror, convex mirror and concave mirror are disposed on the route of the beam from the light valve side. Namely, the present invention is also accomplished by the arrangement of the reflecting mirrors which are so disposed as to have positive refractive power, negative refractive power, positive refractive power, negative refractive power, positive refractive power and positive refractive power in succession from the screen side. Further, the present invention is not limited to the six reflecting mirrors but is also accomplished by three reflecting mirrors or more. Furthermore, a refractive optical element, diffraction optical element may also be used in the above embodiments.

As described above, according to each embodiment of the present invention, there can be provided a projection type displaying apparatus which effects oblique projection and which uses a reflecting optical system which has three or more rotation-asymmetrical reflecting surfaces having curvatures and in which a beam from an image display panel repeats reflection by the plurality of rotation-asymmetrical reflecting surfaces and is projected onto a screen to thereby form a real image, and in which a stop is provided between the rotation-asymmetrical reflecting surface and a reflecting surface or between the reflecting optical system and a display panel so that the image of the stop may be formed at a negative magnification by an optical system more adjacent to the screen than the position of the stop, whereby the downsizing of the apparatus is achieved and yet the ratio of quantity of marginal light is secured and the enlarging rate is high. Further, according to the present embodiment, design is made such that the image plane enlarged and projected onto the screen surface is imaged obliquely relative to the reference axis, and the focal length, the principal point position, etc. evolved about the reference axis are set to appropriate values, whereby in spite of oblique projection, the quantity of light on the screen is made substantially uniform, and distortion, chiefly trapezoid distortion is restrained and a good projected image can be obtained.

According to the present invention, each element is set as described above, whereby there can be achieved a projection optical system using an oblique projection method which contrives the downsizing of the apparatus and yet secures a great ratio of quantity of marginal light and which is high in the enlarging rate, and a projection type displaying apparatus using the same.

What is claimed is:

1. A projection optical system for guiding a beam from an image display panel onto a screen surface, said projection optical system comprising:

a reflecting optical system including a plurality of rotation-asymmetrical reflecting surfaces having curvatures; and a stop between the plurality of rotation-asymmetrical surfaces of said reflecting optical system, wherein said screen surface is inclined relative to a reference axis defined by an optical path linking a center projected image projected onto said screen and a center of said stop, and said stop is imaged with a negative magnification at said screen side from a position of said stop.

2. A projection optical system according to claim 1, wherein the refractive power of the reflecting surface having a curvature on which the light passed through said stop is incident at first is positive.

3. A projection optical system according to claim 1, wherein said reflecting optical system condenses the beam from said image display panel and forms an intermediate image.

4. A projection optical system according to claim 1, wherein at least one of said plurality of rotation-asymmetrical reflecting surfaces comprises a surface reflecting mirror.

5. A projection optical system according to claim 1, wherein at least one of said plurality of rotation-asymmetrical reflecting surfaces comprises a back reflecting mirror.

6. A projection optical system according to claim 1, wherein said reflecting optical system includes at least one optical block designed such that two refracting surfaces and said plurality of rotation-asymmetrical reflecting surfaces having curvatures are formed on the surface of a transparent member, and the beam from said image display panel enters the interior of said transparent member from one of the refracting surfaces, is reflected by said plurality of rotation-asymmetrical reflecting surfaces and emerges from the other refracting surface.

7. A projection optical system according to claim 1, wherein at least two of said plurality of rotation-asymmetrical reflecting surfaces are integrally made by molding.

8. A projection optical system according to claim 1, wherein said reflecting optical system has three or more rotation-asymmetrical aspherical reflecting surfaces.

9. A projection optical system according to claim 1, wherein said reflecting optical system has six rotation-asymmetrical aspherical reflecting surfaces, and said six reflecting surfaces have positive, negative, negative, positive, negative and positive refractive power in succession from the screen side or positive, negative, positive, negative, positive and positive refractive power in succession from the screen side.

10. A projection type displaying apparatus which includes a projection optical system according to claim 1, wherein a beam based on the image display panel is guided onto a screen surface to form image information on said screen surface.

11. A projection type displaying apparatus which includes a projection optical system according to claim 1, wherein a beam based on the image display panel is guided to a transmission type screen through one or more plane mirrors to form image information on said screen surface.

12. A projection optical system according to claim 1, including a lens having a refractive power.

13. A projection optical system for guiding a beam from an image display panel onto a screen surface, said projection optical system comprising:

a reflecting optical system including a plurality of rotation-asymmetrical reflecting surfaces having curvatures; and a stop between the plurality of rotation-asymmetrical surfaces of said reflecting optical system, wherein said screen surface is inclined relative to a reference axis defined by an optical path linking a center projected image projected onto said screen and a center of said stop, and said stop is imaged with a negative magnification at said screen side from a position of said stop, and wherein H($\xi$) is the principal point position at an azimuth $\xi$ degrees on the image display panel side when said reflecting optical system is evolved about the center line linking the center of said image display panel and the center of the image information on the screen surface together, $\alpha$ is the azimuth representing a plane containing said center line and a normal to said screen surface, and the condition that $$|(H(\alpha+90°)-H(\alpha)/H(\alpha)|<0.2$$

is satisfied.

14. A projection optical system according to claim 13, including a lens having a refractive power.

15. A projection optical system for guiding a beam from an image display panel onto a screen surface, said projection optical system comprising:

a reflecting optical system including a plurality of rotation-asymmetrical reflecting surfaces having curvatures; and a stop between the plurality of rotation-asymmetrical surfaces of said reflecting optical system, wherein said screen surface is inclined relative to a reference axis defined by an optical path linking a center projected image projected onto said screen and a center of said stop, and said stop is imaged with a negative magnification at said screen side from a position of said stop, and wherein when the angle formed by the center line linking the center of said image display panel and the center of the image information on the screen surface together and a normal to said screen is defined as θ, and the focal length at an azimuth $\xi$ degrees when said reflecting optical system is evolved about said center line is defined as f($\xi$), and an azimuth representing a plane containing said center line and the normal to said screen is defined as $\alpha$, the condition that $$|1-\cos\theta\cdot f(\alpha)/f(\alpha+90°)|<0.2$$

is satisfied.

16. A projection optical system according to claim 15, including a lens having a refractive power.

17. A projection optical system for projecting light from a display panel, comprising:

a stop; and a plurality of reflecting surfaces;

the refractive power of one of said plurality of reflecting surfaces on which the light passed through said stop is incident at first being positive, wherein said plurality of reflecting surfaces include a plurality of reflecting surfaces having a plurality of rotation-asymmetrical aspherical surfaces and having refractive power, and wherein H($\xi$) is the principal point position at an azimuth $\xi$ degrees on the image display panel side when said reflecting optical system is revolved about the center line linking the center of said image display panel and the center of the image information on the screen surface together, $\alpha$ is an azimuth representing a plane containing said center line and a normal to said screen surface, and the condition that $$|(H(\alpha+90°)-H(\alpha))/H(\alpha)|21\ 0.2$$

is satisfied.

18. A projection optical system according to claim 17, including a lens having a refractive power.

19. A projection optical system for projecting light from a display panel, comprising:

a stop; and a plurality of reflecting surfaces;

the refractive power of one of said plurality of reflecting surfaces on which the light passed through said stop is incident at first being positive, wherein said plurality of reflecting surfaces include a plurality of reflecting surfaces having a plurality of rotation-asymmetrical aspherical surfaces and having refractive power, and wherein when the angle formed by the center line linking the center of said image display panel and the center of the image information on the screen surface together and a normal to said screen is defined as θ, and the focal length at an azimuth ξ degrees when said reflecting optical system is revolved about said center line is defined as f(ξ), and an azimuth representing a plane containing said center line and the normal to said screen is defined as α, the condition that $$|1-\cos\theta \cdot f(\alpha)/f(\alpha+90°)|<0.2$$

is satisfied.

20. A projection optical system according to claim 19, including a lens having a refractive power.

21. A projection optical system for guiding a beam from an image display panel onto a screen surface inclined relative to a reference axis, and forming image information on said screen surface, comprising:
    a reflecting optical system having a plurality of rotation-asymmetrical reflecting surfaces having curvatures;
    wherein the beam from said image display panel is condensed by an optical element including said reflecting optical system to thereby form an intermediate image, and
    wherein H(ξ) is the principal point position at an azimuth ξ degrees on the image display panel side when said reflecting optical system is revolved about the center line linking the center of said image display panel and the center of the image information on the screen surface together, α is an azimuth representing a plane containing said center line and a normal to said screen surface, and the condition that $$|(H(\alpha+90°)-H(\alpha))/H(\alpha)|<0.2$$

is satisfied.

22. A projection optical system according to claim 21, including a lens having a refractive power.

23. A projection optical system for guiding a beam from an image display panel onto a screen surface inclined relative to a reference axis, and forming image information on said screen surface, comprising:
    a reflecting optical system having a plurality of rotation-asymmetrical reflecting surfaces having curvatures;
    wherein the beam from said image display panel is condensed by an optical element including said reflecting optical system to thereby form an intermediate image, and
    wherein when the angle formed by the center line linking the center of said image display panel and the center of the image information on the screen surface together and a normal to said screen is defined as θ, and the focal length at an azimuth ξ degrees when said reflecting optical system is revolved about said center line is defined as f(ξ), and an azimuth representing a plane containing said center line and the normal to said screen is defined as α, the condition that $$|1-\cos\theta \cdot f(\alpha)/f(\alpha+90°)|<0.2$$

is satisfied.

24. A projection optical system according to claim 23, including a lens having a refractive power.

25. A projection optical system for guiding a beam from an image display panel onto a screen surface inclined relative to a reference axis defined by an optical path linking the center of the image display panel and the center of the range of projection on the screen together, and forming image information on said screen surface, comprising:
    a reflecting optical system having a plurality of rotation-asymmetrical reflecting surfaces having curvatures;
    the number of said rotation-asymmetrical reflecting surfaces being three or more,
    wherein H(ξ) is the principal point position at an azimuth ξ degrees on the image display panel side when said reflecting optical system is revolved about the center line linking the center of said image display panel and the center of the image information on the screen surface together, α is an azimuth representing a plane containing said center line and a normal to said screen surface, and the condition that $$|(H(\alpha+90°)-H(\alpha))/H(\alpha)|<0.2$$

is satisfied.

26. A projection optical system according to claim 25, including a lens having a refractive power.

27. A projection optical system for guiding a beam from an image display panel onto a screen surface inclined relative to a reference axis defined by an optical path linking the center of the image display panel and the center of the range of projection on the screen together, and forming image information on said screen surface, comprising:
    a reflecting optical system having a plurality of rotation-asymmetrical reflecting surfaces having curvatures;
    the number of said rotation-asymmetrical reflecting surfaces being three or more,
    wherein when the angle formed by the center line linking the center of said image display panel and the center of the image information on the screen surface together and a normal to said screen is defined as θ, and the focal length at an azimuth ξ degrees when said reflecting optical system is revolved about said center line is defined as f(ξ), and an azimuth representing a plane containing said center line and the normal to said screen is defined as α, the condition that $$|1-\cos\theta \cdot f(\alpha)/f(\alpha+90°)|<0.2$$

is satisfied.

28. A projection optical system according to claim 27, including a lens having a refractive power.

29. A projection optical system for guiding a beam from an image display panel onto a screen surface, said projection optical system comprising:
    a reflecting optical system including a plurality of rotation-asymmetrical reflecting surfaces having curvatures; and
    a stop between said reflecting optical system and said image display panel,
    wherein said screen surface is inclined relative to a reference axis defined by an optical path linking a center projected image projected onto said screen and a center of said stop, and
    said stop is imaged with a negative magnification at said screen side from a position of said stop.

30. A projection optical system according to claim 29, wherein the refractive power of the reflecting surface having a curvature on which the light passed through said stop is incident at first is positive.

31. A projection optical system according to claim 29, wherein said image display panel and said screen are disposed in a non-parallel state.

32. A projection optical system according to claim 29, wherein said reflecting optical system condenses the beam from said image display panel and forms an intermediate image.

33. A projection optical system according to claim 29, wherein at least one of said plurality of rotation-asymmetrical reflecting surfaces comprises a surface reflecting mirror.

34. A projection optical system according to claim 29, wherein at least one of said plurality of rotation-asymmetrical reflecting surfaces comprises a back reflecting mirror.

35. A projection optical system according to claim 29, wherein said reflecting optical system includes at least one optical block designed such that two refracting surfaces and said plurality of rotation-asymmetrical reflecting surfaces having curvatures are formed on the surface of a transparent member, and the beam from said image display panel enters the interior of said transparent member from one of the refracting surfaces, is reflected by said plurality of rotation-asymmetrical reflecting surfaces and emerges from the other refracting surface.

36. A projection optical system according to claim 29, wherein at least two of said plurality of rotation-asymmetrical reflecting surfaces are integrally made by molding.

37. A projection optical system according to claim 29, wherein said reflecting optical system has three or more rotation-asymmetrical aspherical reflecting surfaces.

38. A projection optical system according to claim 29, wherein said reflecting optical system has six rotation-asymmetrical aspherical reflecting surfaces, and said six reflecting surfaces have positive, negative, negative, positive, negative and positive refractive power in succession from the screen side or positive, negative, positive, negative, positive and positive refractive power in succession from the screen side.

39. A projection type displaying apparatus which includes a projection optical system according to claim 29, wherein a beam based on the image display panel is guided onto a screen surface to form image information on said screen surface.

40. A projection type displaying apparatus which includes a projection optical system according to claim 29, wherein a beam based on the image display panel is guided to a transmission type screen through one or more plane mirrors to form image information on said screen surface.

41. A projection optical system according to claim 29, including a lens having a refractive power.

42. A projection optical system for guiding a beam from an image display panel onto a screen surface, said projection optical system comprising:

a reflecting optical system including a plurality of rotation-asymmetrical reflecting surfaces having curvatures; and a stop between said reflecting optical system and said image display panel, wherein said screen surface is inclined relative to a reference axis defined by an optical path linking a center projected image projected onto said screen and a center of said stop, and said stop is imaged with a negative magnification at said screen side from a position of said stop, and wherein $H(\xi)$ is the principal point position at an azimuth $\xi$ degrees on the image display panel side when said reflecting optical system is revolved about the center line linking the center of said image display panel and the center of the image information on the screen surface together, $\alpha$ is the azimuth representing a plane containing said center line and a normal to said screen surface, and the condition that $$|(H(\alpha+90°)-H(\alpha)/H(\alpha)|<0.2$$

is satisfied.

43. A projection optical system according to claim 42, including a lens having a refractive power.

44. A projection optical system for guiding a beam from an image display panel onto a screen surface, said projection optical system comprising:

a reflecting optical system including a plurality of rotation-asymmetrical reflecting surfaces having curvatures; and a stop between said reflecting optical system and said image display panel, wherein said screen surface is inclined relative to a reference axis defined by an optical path linking a center projected image projected onto said screen and a center of said stop, and said stop is imaged with a negative magnification at said screen side from a position of said stop, and wherein when the angle formed by the center line linking the center of said image display panel and the center of the image information on the screen surface together and a normal to said screen is defined as $\theta$, and the focal length at an azimuth $\xi$ degrees when said reflecting optical system is revolved about said center line is defined as $f(\xi)$, and an azimuth representing a plane containing said center line and the normal to said screen is defined as $\alpha$, the condition that $$|1-\cos\theta\cdot f(\alpha)/f(\alpha+90°)|<0.2$$

is satisfied.

45. A projection optical system according to claim 44, including a lens having a refractive power.

* * * * *